US010586118B2

(12) United States Patent
Guo et al.

(10) Patent No.: US 10,586,118 B2
(45) Date of Patent: Mar. 10, 2020

(54) LOCALIZING TRAFFIC SITUATION USING MULTI-VEHICLE COLLABORATION

(71) Applicant: TOYOTA JIDOSHA KABUSHIKI KAISHA, Toyota-shi, Aichi-ken (JP)

(72) Inventors: Rui Guo, Mountain View, CA (US);
Preeti Pillai, Sunnyvale, CA (US);
Kentaro Oguchi, Menlo Park, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/870,870

(22) Filed: Jan. 13, 2018

(65) Prior Publication Data
US 2019/0220678 A1    Jul. 18, 2019

(51) Int. Cl.
*G06K 9/62*        (2006.01)
*G06K 9/00*        (2006.01)
(Continued)

(52) U.S. Cl.
CPC ....... *G06K 9/00805* (2013.01); *G06K 9/6202* (2013.01); *G06K 9/6218* (2013.01);
(Continued)

(58) Field of Classification Search
CPC combination set(s) only.
See application file for complete search history.

(56) References Cited

U.S. PATENT DOCUMENTS 7,974,748 B2 * 7/2011 Goerick ............... B60K 28/165
                                                    701/28
8,213,706 B2    7/2012 Krishnaswamy et al.
(Continued)

FOREIGN PATENT DOCUMENTS

JP    2007003568 A    1/2007
JP    2007122247 A    5/2007
(Continued)

OTHER PUBLICATIONS

"Machine Vision in World Coordinates," MVTec Software GmbH, Munchen Germany, 2003 (144 pages).
(Continued)

*Primary Examiner* — Tsung Yin Tsai
(74) *Attorney, Agent, or Firm* — Patent Law Works LLP

(57) ABSTRACT

A method receives situation data including images from vehicles; clusters, into an image cluster, the images included in the situation data of vehicle(s) located in a geographic region from among the vehicles; locates related situation object(s) in image(s) of the image cluster; matches images from different vehicles in the image cluster, the matched images having corresponding feature(s) of the related situation object(s); determines three-dimensional (3D) sensor coordinates of the related situation object(s) relative to a sensor position of a target vehicle associated with at least one matched image, using the corresponding feature(s) of the related situation object(s) in the matched images; converts the 3D sensor coordinates of the related situation object(s) to geolocation coordinates of the related situation object(s) using geolocation data of the different vehicles associated with the matched images; and determines a coverage area of a traffic situation based on the geolocation coordinates of the related situation object(s).

21 Claims, 10 Drawing Sheets

(51) Int. Cl.
*G08G 1/04* (2006.01)
*G08G 1/09* (2006.01)
*G06T 7/73* (2017.01)

(52) U.S. Cl.
CPC .............. *G06T 7/73* (2017.01); *G08G 1/04* (2013.01); *G08G 1/091* (2013.01); *G06T 2207/30244* (2013.01); *G06T 2207/30261* (2013.01)

(56) References Cited

U.S. PATENT DOCUMENTS

| | | | |
|---|---|---|---|
| 8,249,361 B1 | 8/2012 | Steffens | |
| 8,401,241 B2 | 3/2013 | Chandraker et al. | |
| 8,442,307 B1* | 5/2013 | Anati | G06T 7/73 382/154 |
| 8,805,091 B1* | 8/2014 | Hensel | G06T 3/4038 345/629 |
| 8,948,455 B2* | 2/2015 | Watanabe | G06K 9/00798 382/103 |
| 8,970,357 B2* | 3/2015 | Usami | B60Q 1/143 340/425.5 |
| 9,148,650 B2 | 9/2015 | Chandraker et al. | |
| 9,300,947 B2 | 3/2016 | Park et al. | |
| 9,436,895 B1 | 9/2016 | Jones et al. | |
| 9,805,276 B2 | 10/2017 | Pillai et al. | |
| 9,911,198 B2 | 3/2018 | Pham | |
| 9,979,813 B2* | 5/2018 | Pandurangarao | H04M 1/6075 |
| 10,175,340 B1* | 1/2019 | Abari | G01S 7/006 |
| 2008/0294401 A1 | 11/2008 | Tsin et al. | |
| 2013/0322692 A1* | 12/2013 | Guan | G06K 9/00791 382/103 |
| 2014/0309833 A1 | 10/2014 | Ferguson et al. | |
| 2016/0026880 A1* | 1/2016 | Lee | G06K 9/00798 382/103 |
| 2016/0267331 A1* | 9/2016 | Pillai | G06K 9/4642 |
| 2017/0089710 A1* | 3/2017 | Slusar | B60R 1/00 |
| 2017/0132934 A1* | 5/2017 | Kentley | G08G 1/202 |
| 2017/0178345 A1 | 6/2017 | Pham | |
| 2017/0286782 A1* | 10/2017 | Pillai | B60W 40/08 |
| 2018/0018757 A1 | 1/2018 | Suzuki | |
| 2018/0046649 A1 | 2/2018 | Dal Mutto et al. | |
| 2018/0069937 A1 | 3/2018 | Kolleri | |
| 2018/0203447 A1* | 7/2018 | Wyffels | G06K 9/00 |
| 2019/0310648 A1 | 10/2019 | Yang et al. | |

FOREIGN PATENT DOCUMENTS

| | | |
|---|---|---|
| JP | 2007206099 A | 8/2007 |
| WO | 2013/170882 | 11/2013 |

OTHER PUBLICATIONS

"Introduction to 3D Imaging: Perceiving 3D from 2D Images," retrieved from https://courses.cs.washington.edu/courses/cse576/06sp/notes/ (22 pages).

"Lecture 7: homogeneous coordinates," by Dr. Richard E. Turner, Oct. 31, 2013, retrieved from http://cbl.eng.cam.ac.uk/Public/Turner/Teaching (36 pages).

"Calibration and Projective Geometry (1)" Aaron Bobick, School of Interactive Computing, Fall 2013, retrieved from https://www.cc.gatech.edu/~afb/classes/CS4495-Fall2013/slides/CS4495-07-Calibration.pdf (48 pages).

"Camera Models and Parameters," Jul. 20, 2006, retrieved from http://ftp.cs.toronto.edu/pub/psala/VM/ (35 pages).

"Accurate camera-based traffic sign localization," by Welzel, A., Auerswald, A. and Wanielik, G., Intelligent Transportation Systems (ITSC), 2014 IEEE 17th International Conference.

"Monocular urban localization using street view," by Yu, L., Joly, C., Bresson, G. and Moutarde, F., Control, Automation, Robotics and Vision (ICARCV), 2016 14th International Conference.

Fisher, Bob, "3x4 Projection Matrix," Apr. 16, 1997, retrieved from https://support.pix4d.com/hc/en-us/articles/202559089-How-are-the-Internal-and-External-Camera-Parameters-defined-#gsc.tab=0, 3 pgs.

PIX4D, "How are the Internal and External Camera Parameters defined?" at least as early as Dec. 11, 2017, retrieved from http://homepages.inf.ed.ac.uk/rbf/CVonline/LOCAL_COPIES/EPSRC_SSAZ/node3.html, 3 pgs.

Chayati et al., "Tracking People by Detection Using CNN Features," Procedia Computer Science, vol. 124, Nov. 6-8, 2017, pp. 167-172.

Hadsell et al., "Dimensionality Reduction by Learning an Invariant Mapping," 2006 IEEE Computer Society Conference on Computer Vision and Pattern Recognition, New York, NY, USA, Jun. 17-22, 2006, IEEE, Piscataway, NJ, USA, vol. 2, pp. 1735-1742.

* cited by examiner

LOCALIZING TRAFFIC SITUATION USING MULTI-VEHICLE COLLABORATION

BACKGROUND

The present disclosure relates to localizing traffic situation. In a more particular example, the disclosure relates to technologies for localizing traffic situation on the roads using data from multiple collaborative vehicles.

Path planning often requires geographic location of traffic situations to adapt accordingly. However, it is challenging to determine accurate geographic location of the traffic situations on a geographical map. Today, some modern vehicles rely on a sequence of images they capture for reconstruction of their surrounding environment. However, these vehicles are generally incapable of localizing specific traffic situations in the reconstructed road scene, or to the extent they can localize the traffic situations, such localization is often incomplete or inaccurate due to limited and consistent view angle of the single vehicle from which the sequence of images are captured. In addition, these existing techniques are typically unable to update the accurate location of the traffic situations as the traffic situations dynamically change over time.

SUMMARY

The subject matter described in this disclosure overcomes the deficiencies and limitations of the existing solutions by providing novel technology for localizing traffic situations.

According to one innovative aspect of the subject matter described in this disclosure, a computer-implemented method comprises: receiving situation data including images from vehicles; clustering, into an image cluster, the images included in the situation data of one or more vehicles located in a geographic region from among the vehicles; locating one or more related situation objects in one or more images of the image cluster; matching images from different vehicles in the image cluster, the matched images having one or more corresponding features of the one or more related situation objects; determining three-dimensional (3D) sensor coordinates of the one or more related situation objects relative to a sensor position of a target vehicle associated with at least one of the matched images, using the one or more corresponding features of the one or more related situation objects in the matched images; converting the 3D sensor coordinates of the one or more related situation objects to geolocation coordinates of the one or more related situation objects using geolocation data of the different vehicles associated with the matched images; and determining a coverage area of a traffic situation based on the geolocation coordinates of the one or more related situation objects.

In general, another innovative aspect of the subject matter described in this disclosure may be embodied in computer-implemented methods comprising: receiving situation data including images from vehicles; clustering, into an image cluster, the images included in the situation data of one or more vehicles located in a geographic region from among the vehicles; locating one or more related situation objects in one or more images of the image cluster; matching images from different vehicles in the image cluster, the matched images having one or more corresponding features of the one or more related situation objects; determining three-dimensional (3D) sensor coordinates of the one or more related situation objects relative to a sensor position of a target vehicle associated with at least one of the matched images, using the one or more corresponding features of the one or more related situation objects in the matched images; converting the 3D sensor coordinates of the one or more related situation objects to geolocation coordinates of the one or more related situation objects using geolocation data of the different vehicles associated with the matched images; determining a coverage area of a traffic situation based on the geolocation coordinates of the one or more related situation objects; and determining a navigation path associated with the geographical region based on the coverage area of the traffic situation.

In general, another innovative aspect of the subject matter described in this disclosure may be embodied in systems comprising: one or more processors; one or more memories storing instructions that, when executed by the one or more processors, cause the system to: receive situation data including images from vehicles; cluster, into an image cluster, the images included in the situation data of one or more vehicles located in a geographic region from among the vehicles; locate one or more related situation objects in one or more images of the image cluster; match images from different vehicles in the image cluster, the matched images having one or more corresponding features of the one or more related situation objects; determine three-dimensional (3D) sensor coordinates of the one or more related situation objects relative to a sensor position of a target vehicle associated with at least one of the matched images, using the one or more corresponding features of the one or more related situation objects in the matched images; convert the 3D sensor coordinates of the one or more related situation objects to geolocation coordinates of the one or more related situation objects using geolocation data of the different vehicles associated with the matched images; and determine a coverage area of a traffic situation based on the geolocation coordinates of the one or more related situation objects.

These and other implementations may each optionally include one or more of the following features: that the matched images from the different vehicles are captured by images sensors having different sensor configurations; that converting the 3D sensor coordinates of the one or more related situation objects to the geolocation coordinates of the one or more related situation objects includes determining geolocation coordinates of sensor positions of the different vehicles associated with the matched images, determining view angles from the sensor positions of the different vehicles associated with the matched images to a first related situation object among the one or more related situation objects using the 3D sensor coordinates of the first related situation object, and determining the geolocation coordinates of the first related situation object based on the geolocation coordinates of the sensor positions of the different vehicles and the view angles from the sensor positions of the different vehicles to the first related situation object using triangulation computation; that determining the coverage area of the traffic situation includes positioning the one or more related situation objects on a geographical map associated with the geographic region using the geolocation coordinates of the one or more related situation objects, and determining a convex geographical area encompassing the one or more related situation objects on the geographical map to be the coverage area of the traffic situation; that determining a first coverage area of the traffic situation at a first time, determining a second coverage area of the traffic situation at a second time, determining a localization difference between the first coverage area and the second coverage area, determining that the localization difference between the first coverage area and the second coverage area satisfies a difference threshold, and responsive to determining that the localization difference between the first coverage area and the second coverage area satisfies the difference threshold, updating a geographical map associated with the geographic region to include the second coverage area of the traffic situation; that determining that the localization difference between the first coverage area and the second coverage area satisfies the difference threshold includes determining one or more first lanes associated with the first coverage area, determining one or more second lanes associated with the second coverage area, and determining that the one or more second lanes are different from the one or more first lanes; that determining one or more proximate vehicles associated with the geographic region, and transmitting a notification of situation update to the one or more proximate vehicles, the notification of situation update including the second coverage area of the traffic situation; that the geographic region is a predefined road segment; that clustering the images included in the situation data of the one or more vehicles located in the geographic region includes clustering the images based on image timestamp of the images; that the situation data received from a first vehicle among the vehicles includes one or more of a first image captured by an image sensor of the first vehicle, image data associated with the first image, a sensor configuration of the image sensor, and the geolocation data of the first vehicle associated with the first image.

Other implementations of one or more of these and other aspects include corresponding systems, apparatus, and computer programs, configured to perform the actions of methods, encoded on non-transitory computer storage devices.

The novel technology for localizing traffic situations presented in this disclosure is particularly advantageous in a number of respects. For example, the technology described herein is capable of determining geographic coordinates of related situation objects included in the traffic situation. Therefore, the coverage area representing the traffic situation can be rendered precisely on the geographical map and provide a comprehensive understanding of the traffic situation in various aspects (e.g., geographic location, geometric boundary, scene components, object distribution, etc.). As a further example, the present technology localizes the traffic situations based on the data captured from multiple perspectives of multiple collaborative vehicles. Therefore, the present technology can avoid potential repeated errors caused by limited observation from single perspective of each individual vehicle, and thus the accuracy of the traffic situation localization can be improved. Furthermore, the technology described herein can also detect dynamic changes of the traffic situations in real-time, and update the coverage area of the traffic situations accordingly.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can accurately determine geographic location and geometric boundary of traffic situations on the roads using multi-vehicle collaboration. As described in further detail below, the technology includes methods and corresponding systems that can determine geolocation coordinates of related situation objects, based on corresponding features of the related situation objects in road scene images captured from different perspectives by multiple vehicles. As a result, the related situation objects included in the traffic situation can be precisely localized on the geographical map, thereby indicating the coverage area of the traffic situation. In this present disclosure, precise or accurate localization of the traffic situation may refer to localizing the traffic situation using geolocation (e.g., GPS coordinates) of the related situation objects, rather than estimating the locations of the traffic situation relative to a selected reference point.

Figure 1:
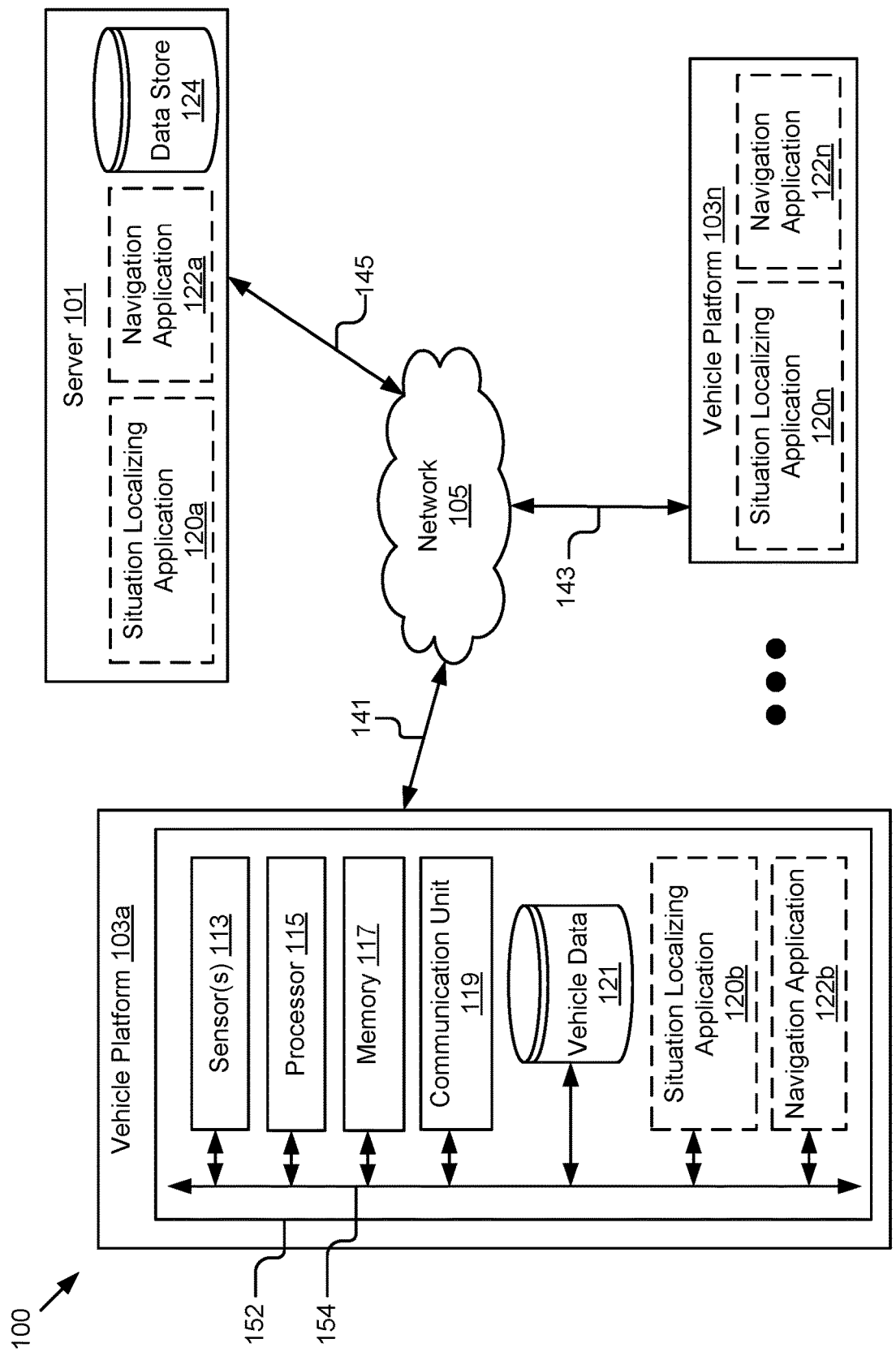
FIG. 1 is a block diagram of an example system for localizing traffic situations.

FIG. 1 is a block diagram of an example system 100 for localizing traffic situations on the roads. As shown, the system 100 includes a server 101 and one or more vehicle platforms 103a . . . 103n coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 105 that couples to the server 101 and the vehicle platform(s) 103, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, a situation localizing application 120, and a navigation application 122. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be coupled to the network 105 via signal line 141, and may send and receive data to and from other vehicle platform(s) 103 and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the responsive platform 103, the processor may be an electronic control unit (ECU) implemented in the responsive platform 103 such as a car, although other types of platform are also possible and contemplated. The ECUs may receive and store the sensor data as vehicle operation data in the vehicle data store 121 for access and/or retrieval by the situation localizing application 120. In some implementations, the processor(s) 115 may be capable of generating and providing electronic display signals to input/output device(s), supporting the display of images, capturing and transmitting images, performing complex tasks including various types of object recognition and situation detection, etc. In some implementations, the processor(s) 115 may be coupled to the memory(ies) 117 via the bus 154 to access data and instructions therefrom and store data therein. The bus 154 may couple the processor(s) 115 to the other components of the responsive platform(s) 103 including, for example, the sensor(s) 113, the memory(ies) 117, the communication unit(s) 119, and/or and the vehicle data store 121.

The situation localizing application 120 is computer logic executable to localize traffic situations on the roads. As illustrated in FIG. 1, the server 101 and the vehicle platform 103a . . . 103n may include instances 120a and 120b . . . 120n of the situation localizing application 120. In some embodiments, each instance 120a and 120b . . . 120n may comprise one or more components the situation localizing application 120 depicted in FIG. 2, and may be configured to fully or partially perform the functionalities described herein depending on where the instance resides. In some embodiments, the situation localizing application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The situation localizing application 120 may receive and process the sensor data and/or the vehicle data, and communicate with other elements of the vehicle platform 103 via the bus 154, such as the memory 117, the communication unit 119, the vehicle data store 121, etc. The situation localizing application 120 is described in details below with reference to at least FIGS. 2-8B.

The navigation application 122 is computer logic executable to provide navigational guidance to users. As illustrated in FIG. 1, the server 101 and the vehicle platform 103a . . . 103n may include instances 122a and 122b . . . 122n of the navigation application 122. In some embodiments, the navigation application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the navigation application 122 may perform path planning to determine or update navigation paths based on coverage areas of one or more traffic situations determined by the situation localizing application 120, generate corresponding navigation instructions to adapt the navigation paths to the coverage areas of the traffic situations occupying the roads (e.g., suggesting a lane change maneuver), and provide the navigation instructions to the user via one or more output devices of the vehicle platform 103.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the situation localizing application 120 and/or the navigation application 122. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other computing nodes, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geolocation sensors, orientation sensor, wireless transceivers (e.g., cellular, WiFi, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, static road objects (e.g., traffic cones, barricades, traffic signs, lanes, road markings, etc.), and/or dynamic road objects (e.g., surrounding vehicle platforms 103, road workers, construction vehicles, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different camera parameters and may be configured with different settings, installations, and/or configurations.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may also include road scene images captured by one or more image sensors 113 of the vehicle platform 103 and the image data associated with these images. In some embodiments, the image data may include an image timestamp indicating date and time when the image is captured, object categories of detected objects in the image, and/or types of traffic situation associated with the object categories, etc.

In some embodiments, the vehicle data may also include sensor configurations of the sensors 113. As an example, the sensor configurations associated with each image sensor 113 of the vehicle platform 103 may include extrinsic camera parameters and intrinsic camera parameters of the image sensor. In some embodiments, the extrinsic camera parameters may indicate the sensor position and sensor orientation of the image sensor in a world coordinate system (e.g., the GPS coordinate system). Non-limiting examples of the extrinsic camera parameters may include, but are not limited to, field of view (e.g., view angle), camera height (e.g., distance from the image sensor to the ground), etc. In some embodiments, the extrinsic camera parameters of the image sensor may be represented by a rotation matrix and a translation vector.

In some embodiments, the intrinsic camera parameters may indicate internal properties of the image sensor and may be specified by camera configuration. Non-limiting examples of the intrinsic camera parameters may include, but are not limited to, focal length, resolution, distortion metric, skew coefficient, etc. In some embodiments, the intrinsic camera parameters of the image sensor may be represented by a camera intrinsic matrix. In some embodiments, the extrinsic camera parameters (e.g., the rotation matrix and the translation vector) and the intrinsic camera parameters (e.g., the camera intrinsic matrix) may be used to perform various transformations, thereby projecting a physical feature point of a situation object in the world coordinate system to a corresponding image feature point in the image coordinate system of a road scene image captured by the image sensor.

In some embodiments, the vehicle data store 121 may also store a situation object database that includes various types of traffic situation, each type of traffic situation may be associated with multiple object categories potentially present in the traffic situation. For example, the situation object database may include the traffic situation of "construction scene," the traffic situation of "accident scene," the traffic situation of "weather-related incident," the traffic situation of "community event," etc. As an example, the traffic situation of "construction scene" may be associated with the object category of "construction sign," the object category of "construction vehicle," the object category of "road worker," the object category of "traffic cone," etc. In another example, the traffic situation of "accident scene" may be associated with the object category of "barricade," the object category of "road-closed sign," the object category of "police officer," the object category of "emergency vehicle" (e.g., ambulances, fire trucks, police cars, etc.), etc. In some embodiments, each object category may describe various situation objects categorized into the object category. For example, the object category of "construction sign" may describe various types of construction signs having different designs, shapes, colors, etc. In some embodiments, the vehicle data store 121 may be part of a data storage system (e.g., a standard data or database management system) for storing and providing access to data. Other types of data stored in the vehicle data store 121 are also possible and contemplated.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server may send and receive data to and from other entities of the system 100, e.g., one or more vehicle platforms 103. As depicted, the server 101 may include an instance of the situation localizing application 120a and/or the navigation application 122a. The server 101 may also include a data store 104 that stores various types of data for access and/or retrieval by these applications. For example, the data store 104 may store situation data received from the vehicle platform(s) 103, localization data of traffic situation(s), situation object database, map database, etc. In some embodiments, the map database may include map data describing one or more geographic regions included in geographical maps. For example, the map data may divide a particular road into multiple geographic regions, each geographic region is corresponding to a predefined road segment of the particular road. In some embodiments, the localization data of a particular traffic situation may describe the coverage area representing that traffic situation (e.g., geolocation, geometric boundary (e.g., geometric shape, occupied lanes), related situation objects present in the traffic situation, etc.) at various points in time.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
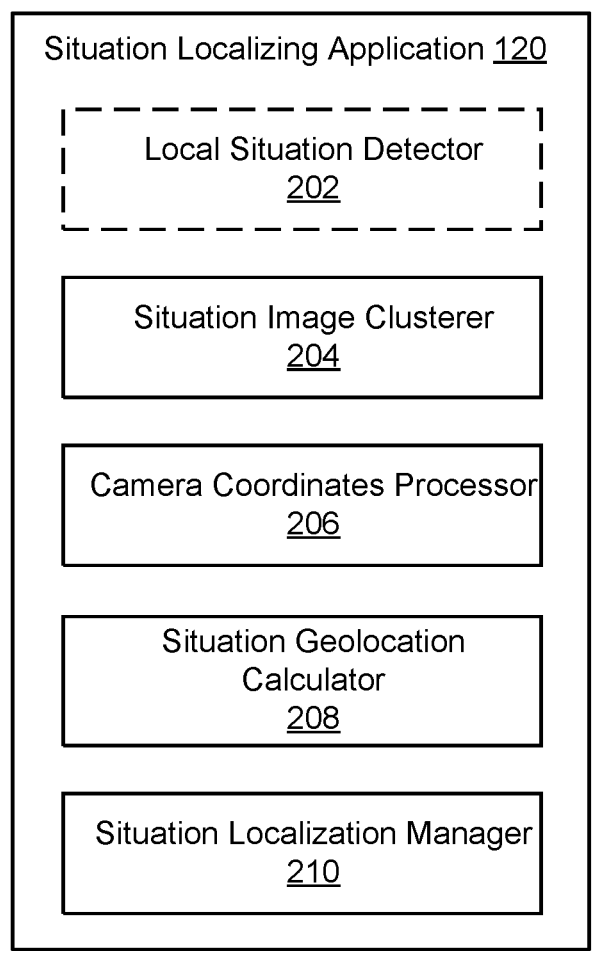
FIG. 2 is a block diagram of an example situation localizing application.

FIG. 2 is a block diagram of an example situation localizing application 120. As depicted, the situation localizing application 120 may include a local situation detector 202, a situation image clusterer 204, a camera coordinates processor 206, a situation geolocation calculator 208, and a situation localization manager 210, although it should be understood that the situation localizing application 120 may include additional components such as, but not limited to, a configuration engine, other training engines, an encryption/decryption engine, etc., and/or these various components may be combined into a single engine or divided into additional engines.

The local situation detector 202, the situation image clusterer 204, the camera coordinates processor 206, the situation geolocation calculator 208, and the situation localization manager 210 may be implemented as software, hardware, or a combination of the foregoing. In some embodiments, the local situation detector 202, the situation image clusterer 204, the camera coordinates processor 206, the situation geolocation calculator 208, and the situation localization manager 210 may be communicatively coupled by the bus 154 and/or the processor 115 to one another and/or the other components of the computing device 152. In some embodiments, one or more of the components 103, 202, 204, 206, 208, and/or 210 are sets of instructions executable by the processor 115 to provide their functionality. In further embodiments, one or more of the components 103, 202, 204, 206, 208, and/or 210 are storable in the memory 117 and are accessible and executable by the processor 115 to provide their functionality. In any of the foregoing embodiments, these components 103, 202, 204, 206, 208, and/or 210 may be adapted for cooperation and communication with the processor 115 and other components of the computing device 152.

The situation localizing application 120, and its components 202, 204, 206, 208, and 210 are described in further detail below with reference to at least FIGS. 3-8B.

As discussed elsewhere herein, the situation localizing application 120 is computer logic executable to localize traffic situations on the roads. The traffic situation occupies at least a portion of the road and may be represented by a coverage area that encompasses the related situation objects detected in the traffic situation. Therefore, in some embodiments, the coverage area of the traffic situation may be localized by determining geographic location of the related situation objects, and determining the convex geographic area covering these related situation objects. The coverage area of the traffic situation may be rendered on the geographical map, and thus accurately indicating the geographic location and the geometric boundary of the traffic situation.

Figure 3:
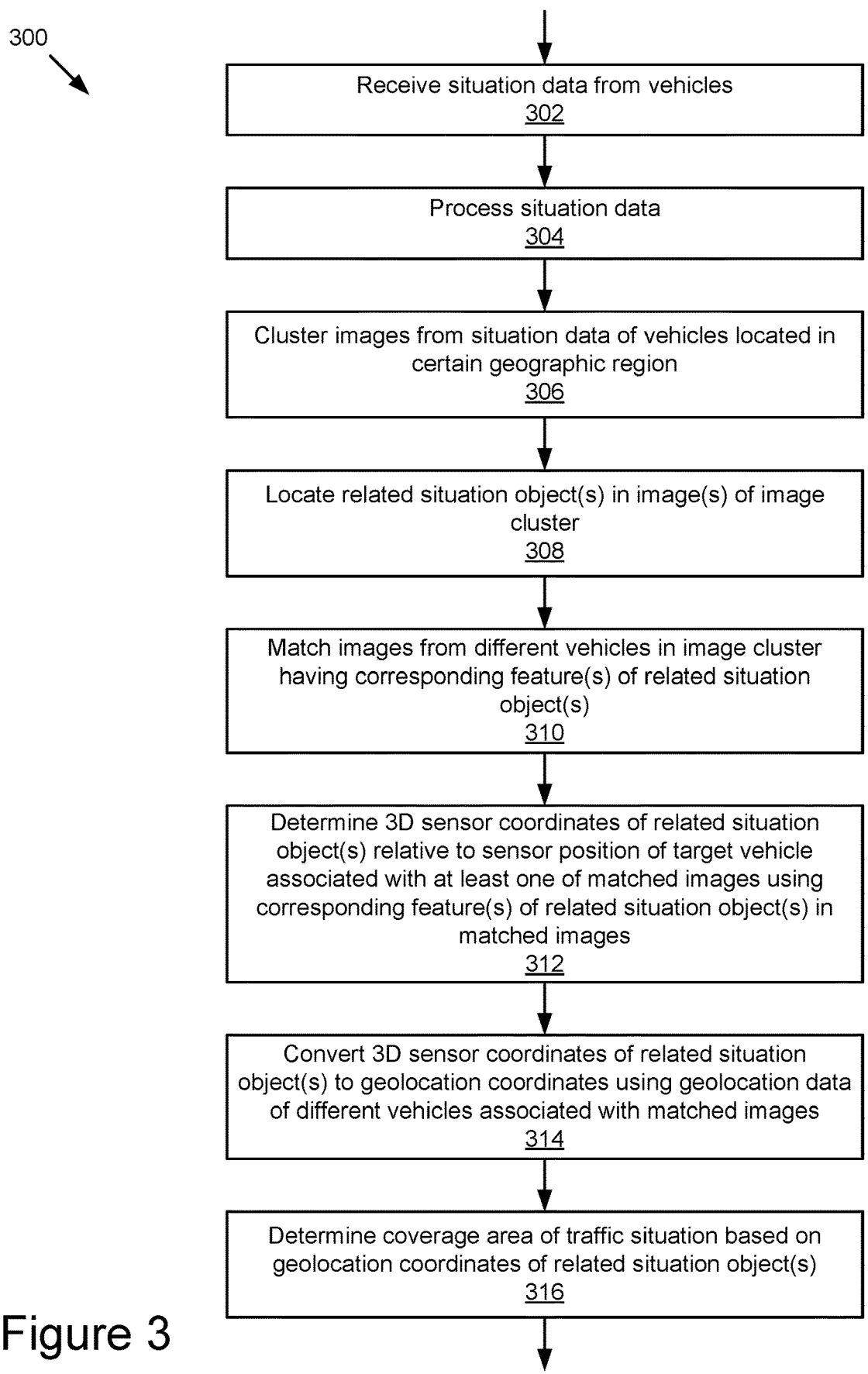
FIG. 3 is a flowchart of an example method for localizing a traffic situation.

FIG. 3 is a flowchart of an example method 300 for localizing traffic situations. In block 302, the situation image clusterer 204 is executable (e.g., by programming the processor(s) 115) to receive situation data from vehicle platforms 103, e.g., via the communication unit 119. In some embodiments, the vehicle platforms 103 can detect traffic situations as they travel along the roads. When a vehicle platform 103 encounters a traffic situation, the vehicle platform 103 may detect the traffic situation, generate situation data describing the traffic situation as locally perceived from its individual perspective, and transmit the situation data to the processing entity of the system 100, e.g., the server 101.

Figure 6:
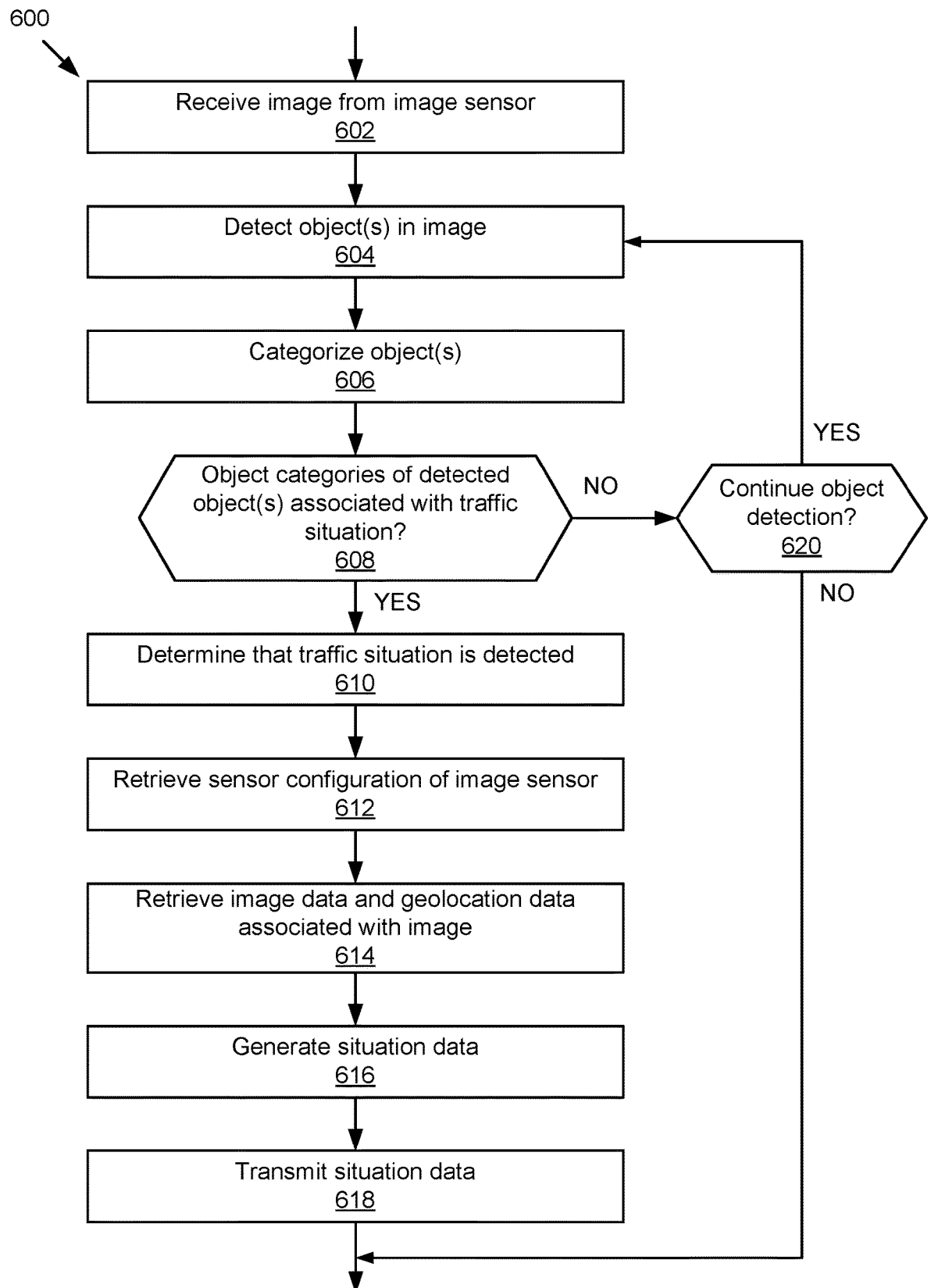
FIG. 6 is a flowchart of an example method for detecting a traffic situation and generating situation data describing the traffic situation.

By way of further illustration, FIG. 6 is a flowchart of an example method 600 for detecting a traffic situation and generating the situation data describing the traffic situation. In some embodiments, the method 600 may be performed by the local situation detector 202 of the situation localizing application 120 included in the vehicle platforms 103. As described elsewhere herein, the situation localizing application 120 may be configured to enable or disable the local situation detector 202. For example, if the situation localizing application 120 is included in the vehicle platforms 103, the local situation detector 202 may be enabled and configured to detect the traffic situation and generate the situation data. If the situation localizing application 120 is included in the server 101, the local situation detector 202 may be disabled.

In block 602, the local situation detector 202 may receive an image from the image sensor 113 of the vehicle platform 103. The image sensor 113 may capture images of the road scene as the vehicle platform 103 travels along the road. In some embodiments, these road scene images may be captured at a predefined rate/interval (e.g., every 5 seconds, 10 seconds, 30 seconds, etc.).

In block 604, the local situation detector 202 may detect one or more objects in the image. For example, the local situation detector 202 may perform object recognition on the image (e.g., using vision algorithm) to detect one or more objects present in the road scene. In block 606, the local situation detector 202 may categorize the detected objects into object categories. In some embodiments, the object recognition may be performed using machine learning techniques with each detected object being recognized with a confidence score. As an example, the local situation detector 202 may detect three objects in the image. The local situation detector 202 may categorize the first detected object into the object category of "traffic cone" with the confidence score of 72.5%, categorize the second detected object into the object category of "construction vehicle" with the confidence score of 54%, and categorize the third detected object into the object category of "vehicle" with the confidence score of 63%. In some embodiments, the detected objects having confidence score less than a predetermined confidence threshold (e.g., below 50%) may be disregarded.

In block 608, the local situation detector 202 may determine whether the object categories of one or more detected objects is associated with a type of traffic situation in the situation object database. The detected objects having the object category associated with a traffic situation may be referred to herein as related situation objects. If in block 608, the local situation detector 202 determines that the object categories of one or more detected objects is associated with a type of traffic situation, the method 600 proceeds to block 610. In block 610, the local situation detector 202 may determine that a traffic situation is detected. In some embodiments, the local situation detector 202 may update a situation detection status to be "true" and aggregate relevant data to generate situation data describing the traffic situation.

In some embodiments, the local situation detector 202 may also determine the type of traffic situation that the vehicle platform 103 encounters. In particular, the local situation detector 202 may determine a number of detected objects in the image that have the object category associated with the same type of traffic situation, e.g., the traffic situation of "construction scene." In this example, if the number of detected objects having the object category associated with the traffic situation of "construction scene" satisfies a predetermined number threshold (e.g., more than 4 related situation objects), the local situation detector 202 may determine that the vehicle platform 103 encounters a traffic situation of construction scene. In some embodiments, the local situation detector 202 may store the determined type of traffic situation and/or the object categories of the related situation objects as image data associated with the image in the vehicle data store 121.

In block 612, the local situation detector 202 may retrieve sensor configurations of the image sensor capturing the image from the vehicle data store 121. As discussed elsewhere herein, the sensor configurations may include extrinsic camera parameters (e.g., rotation matrix and translation vector) reflecting the sensor position and sensor orientation of the image sensor in the world coordinate system, and intrinsic camera parameters (e.g., camera intrinsic matrix) indicating internal properties of the image sensor.

In block 614, the local situation detector 202 may retrieve image data and geolocation data of the vehicle platform 103 associated with the image from the vehicle data store 121. As discussed elsewhere herein, the image data may include image timestamp indicating the date and time when the image was captured, the object categories of the one or more detected objects in the image, and/or the type of traffic situation associated with these object categories. The geolocation data associated with the image may indicate the vehicle geolocation (e.g., GPS coordinates) of the vehicle platform 103 when the image was captured and may be retrieved using the image timestamp.

In block 616, the local situation detector 202 may generate the situation data describing the traffic situation from the individual perspective of the vehicle platform 103. In some embodiments, the situation data may include the captured image, the image data associated with the image, the sensor configurations of the image sensor capturing the image, and the geolocation data of the vehicle platform 103 associated with the image. In some embodiments, the situation data may be generated in any form of data file format and may be compressed and/or encrypted to be efficiently exchanged between different entities of the system 100. In block 618, the local situation detector 202 may transmit the situation data to the server 101, e.g., via the network 105.

If in block 608, the local situation detector 202 determines that the object categories of one or more detected objects in the image is not associated with any type of traffic situation in the situation object database, the method 600 proceeds to block 620. In block 620, the local situation detector 202 may determine whether to continue performing object detection. For example, the local situation detector 202 may determine to continue detecting and categorizing objects in the image if the amount of processing time for detecting related situation objects in the image satisfies a threshold amount of time (e.g., less than 30 seconds). In another example, the local situation detector 202 may determine to suspend (e.g., temporarily, for a predetermined period of time, etc.) and/or not continue detecting and categorizing objects in the image if the number of attempts to detect related situation objects in the image satisfies a threshold number of times (e.g., more than 4 times). If in block 618, the local situation detector 202 determine to continue performing object detection, the method 600 proceeds to block 604. If in block 618, the local situation detector 202 determine to not continue performing object detection, the method 600 may end.

Referring back to FIG. 3, in block 304, the situation image clusterer 204 may process the situation data received from the vehicle platforms 103. In particular, the situation image clusterer 204 may process the situation data received from each vehicle platform 103 to extract the image captured by the image sensor of the vehicle platform 103, the image data associated with the image, the geolocation data of the vehicle platform 103 associated with the image (e.g., the geolocation (e.g., GPS, etc.) coordinates of the vehicle platform 103 when the image was captured), and the sensor configurations of the image sensor capturing the image.

In block 306, the situation image clusterer 204 may cluster the images included in the situation data of one or more vehicle platforms 103 that are located in a certain geographic region from among the vehicle platforms 103. In particular, the situation image clusterer 204 may retrieve the map data describing the geographic regions (e.g., predefined road segments) from the map database in the data store 124 and the vehicle geolocation (e.g., GPS coordinates) extracted from the situation data of the vehicles platforms 103. The situation image clusterer 204 may map the vehicle geolocation of the vehicle platforms 103 to the geographic regions, and determine one or more vehicles platforms 103 that are located in the same geographic region from among the vehicles platforms 103. The images extracted from the situation data of the vehicles platforms 103 located in the same geographic region may be clustered into one image cluster. As a result, the images in the same image cluster may depict the same traffic situation in the geographic region, but from various perspectives and with various camera configurations corresponding to multiple vehicles platforms 103 located in the geographic region. Using these clustered images to localize the traffic situation is particularly advantageous, because it reduces potential errors and/or failures caused by similar perspective of a single vehicle that results in incomplete observation and perception of the road scene.

In some embodiments, the situation image clusterer 204 may also cluster the images extracted from the situation data based on the image timestamp of the images. As a result, the image cluster may include the images captured within the same time window by the image sensors of the vehicles platforms 103 located in the same geographic region. For example, the images extracted from the situation data of the vehicles platforms 103 located in a predefined road segment of (Main St.: between Washington St. and Beacon St.) and having the image timestamp within the time window of (Dec. 25, 2017: 8 am-9 am) may be clustered together to generate an image cluster.

In block 308, the camera coordinates processor 206 may locate one or more related situation objects in one or more images of the image cluster. The camera coordinates processor 206 may locate the related situation objects with a higher level of refinement than the object detection performed at the vehicle platform 103 to detect the traffic situation, and thus additional related situation objects in the image may be identified. In some embodiments, the camera coordinates processor 206 may determine the type of traffic situation captured in the image of the image cluster using the image data associated with the image. As discussed elsewhere herein, the image data associated with the image is included in the situation data generated by the corresponding vehicle platform 103. In some embodiments, the type of traffic situation may be extracted directly from the image data associated with the image, or may be determined based on the object categories extracted from the image data associated with the image. In some embodiments, the camera coordinates processor 206 may determine the object categories associated with the type of traffic situation in the situation object database, and locate the related situation objects of these object categories in the image.

As an example, the image data associated with an image of the image cluster may indicate that the image includes one or more related situation objects in the object category of "traffic cone." The camera coordinates processor 206 may determine that the object category of "traffic cone" is associated with the traffic situation of "construction scene" in the situation object database. In the situation object database, the traffic situation of "construction scene" is associated with the object category of "traffic cone," and also associated with the object category of "construction sign," the object category of "construction vehicle," the object category of "road worker," etc. Therefore, the camera coordinates processor 206 may locate the related situation objects classified into these object categories in the image. As a result, the camera coordinates processor 206 may identify additional related situation objects in the captured image that may be present in the traffic situation of "construction scene" but for some reasons are not detected or included in the image data of the image.

In block 310, the camera coordinates processor 206 may match images from different vehicle platforms 103 in the image cluster. The matched images may have one or more corresponding features of one or more related situation objects. For example, the camera coordinates processor 206 may match a first image captured by a first image sensor of a first vehicle platform 103 to a second image captured by a second image sensor of a second vehicle platform 103. The first image and the second image may be included in the same image cluster, and the first image sensor capturing the first image may have different sensor configurations (e.g., different extrinsic camera parameters and/or different intrinsic camera parameters) from the second image sensor capturing the second image.

In particular, the camera coordinates processor 206 may determine one or more features describing a first related situation object in the first image. In some embodiments, the features may include one or more first image feature points describing the object appearance (e.g., object landmarks, boundaries, structure, shape, size, etc.) of the first related situation object in the first image. In some embodiments, the camera coordinates processor 206 may determine second image feature points in the second image that match the first image feature points in the first image. For example, the camera coordinates processor 206 may compare various aspects of the first image feature points and the second image feature points (e.g., pixel color, brightness value, shape, etc.) to generate a similarity score. If the similarity score indicating the similarity between the first image feature points and the second image feature points satisfies a predetermined similarity threshold, the camera coordinates processor 206 may determine that the second image feature points in the second image are corresponding to the first image feature points in the first image, and thus match the second image to the first image in the image cluster. In some embodiments, the corresponding features in the first image and the second image may be identified using deep learning algorithms.

Figure 7A:
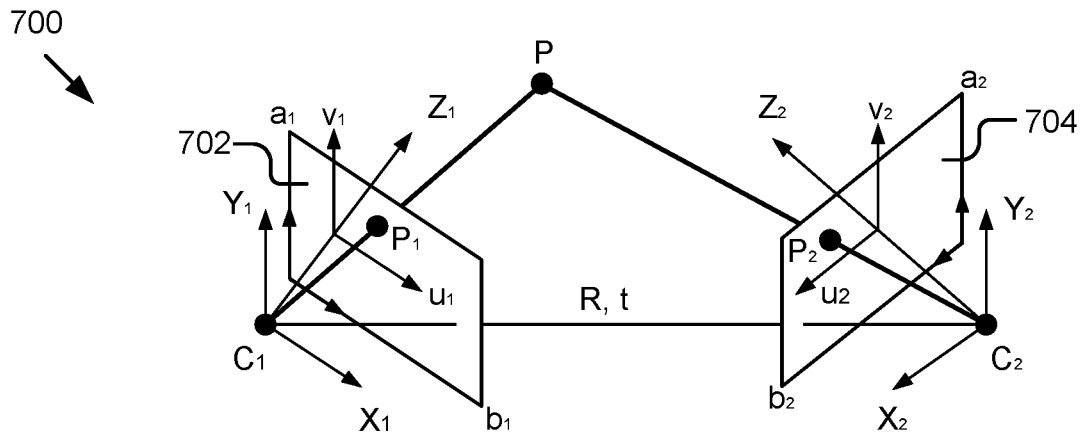
FIG. 7A illustrates projections of a physical feature point onto image planes of two images captured from two different perspectives.

In some embodiments, the first image feature points in the first image and the second image feature points in the second image that match the first image feature points may be the projections of the same physical feature points of the first related situation object onto the first image and the second image respectively. FIG. 7A illustrates the projections of the physical feature point P of the first related situation object in the real world to the first image feature point $P_1$ in the first image 702 and the second image feature point $P_2$ in the second image 704. As discussed elsewhere herein, the first image 702 may be captured by the first image sensor of the first vehicle platform 103 having the first sensor configurations, and the second image 704 may be captured by the second image sensor of the second vehicle platform 103 having the second sensor configurations. Therefore, as depicted in FIG. 7A, the first image 702 including the first image feature point $P_1$ may be associated with a first camera coordinate system $(X_1, Y_1, Z_1)$ of the first image sensor. The second image 704 including the second image feature point $P_2$ may be associated with a second camera coordinate system $(X_2, Y_2, Z_2)$ of the second image sensor.

In some embodiments, the first camera coordinate system $(X_1, Y_1, Z_1)$ of the first image sensor may be a three dimensional (3D) coordinate system with the first point of origin $C_1$ indicating a first sensor position of the first image sensor when the first image 702 is captured. The first point of origin $C_1$ may be positioned at the optical center (e.g., the center of projection) of the first image sensor. Similarly, the second camera coordinate system $(X_2, Y_2, Z_2)$ of the second image sensor may be a 3D coordinate system with the second point of origin $C_2$ indicating a second sensor position of the second image sensor when the second image 704 is captured. The second point of origin $C_2$ may be positioned at the optical center (e.g., the center of projection) of the second image sensor.

In some embodiments, the second camera coordinate system $(X_2, Y_2, Z_2)$ of the second image sensor may be transformed to the first camera coordinate system ($X_1$, $Y_1$, $Z_1$) of the first image sensor using the rotation matrix R and the translation vector t. The rotation matrix R and the translation vector t may be determined based on the extrinsic camera parameters of the first image sensor, the extrinsic camera parameters of the second image sensor, the distance between the first image sensor and the second image sensor when the matched images are captured, etc. As discussed elsewhere herein, the extrinsic camera parameters of an image sensor may indicate the sensor position and the sensor orientation of that image sensor. The distance between the first image sensor and the second image sensor when the matched images are captured may be derived from the vehicle geolocation of the first vehicle platform 103 associated with the first image 702 and the vehicle geolocation of the second vehicle platform 103 associated with the second image 704. As illustrated in FIG. 7A, the first image 702 may be represented by a first image coordinate system ($a_1$, $b_1$) and the second image 704 may be represented by a second image coordinate system ($a_2$, $b_2$). The first image coordinate system ($a_1$, $b_1$) representing the image plane of the first image 702 and the second image coordinate system ($a_2$, $b_2$) representing the image plane of the second image 704 may be a two dimensional (2D) coordinate system.

Referring back to FIG. 3, in block 312, the camera coordinates processor 206 may determine 3D sensor coordinates of the one or more related situation objects relative to the sensor position of a target vehicle platform associated with at least one image in the matched images. In some embodiments, the 3D sensor coordinates of the related situation objects may be the 3D camera coordinates of the related situation objects in the camera coordinate system of the image sensor associated with the target vehicle platform. In some embodiments, the camera coordinates processor 206 may identify the vehicle platforms 103 associated with at least one matched image of the image cluster, and randomly select the target vehicle platform from the vehicle platforms 103 associated with at least one matched image. In some embodiments, the camera coordinates processor 206 may use the camera coordinate system of the image sensor associated with the target vehicle platform as a target camera coordinate system in which the 3D camera coordinates of the related situation objects are determined. In the above example, the matched images of the image cluster include the first image and the second image. The camera coordinates processor 206 may select the first vehicle platform 103 associated with the first image to be the target vehicle. Thus, the target camera coordinate system may be the first camera coordinate system ($X_1$, $Y_1$, $Z_1$) of the first image sensor associated with the first vehicle platform 103.

In some embodiments, the 3D sensor coordinates of the related situation objects relative to the sensor position of the target vehicle platform may be determined using the corresponding features of the related situation objects in the matched images. As discussed elsewhere herein, the related situation object is represented in the matched images with the corresponding features, and the matched images are captured from different perspectives of different vehicle platforms 103. Therefore, the 3D sensor coordinates of the related situation object (e.g., the 3D camera coordinates of the related situation object in the target camera coordinate system) can be determined from these corresponding features in the matched images. In the above example, the first image feature point $P_1$ in the first image 702 is corresponding to the second image feature point $P_2$ in the second image 704. The first image feature point $P_1$ and the second image feature point $P_2$ represent the same physical feature point P in two matched images that are captured from different perspectives and with different sensor configurations of the first image sensor and the second image sensor. Therefore, the 3D camera coordinates of the physical feature point P in the target camera coordinate system ($X_1$, $Y_1$, $Z_1$) may be computed from the first image feature point $P_1$ in the first image 702 and the second image feature point $P_2$ in the second image 704.

As depicted in FIG. 7A, the first image 702 including the first image feature point $P_1$ is associated with the first camera coordinate system ($X_1$, $Y_1$, $Z_1$) of the first image sensor, while the second image 704 including the second image feature point $P_2$ is associated with the second camera coordinate system ($X_2$, $Y_2$, $Z_2$) of the second image sensor. Therefore, the camera coordinates processor 206 may perform coordinate transformation to transform the coordinates of the first image feature point $P_1$ and/or the coordinates of the second image feature point $P_2$ into the same camera coordinate system, e.g., the target camera coordinate system ($X_1$, $Y_1$, $Z_1$). Once the first image feature point $P_1$ and the second image feature point $P_2$ are associated with the same target camera coordinate system ($X_1$, $Y_1$, $Z_1$), the 3D camera coordinates of the physical feature point P in the target camera coordinate system ($X_1$, $Y_1$, $Z_1$) may be determined based on the first image feature point $P_1$ and the second image feature point $P_2$ as discussed above. The 3D camera coordinates of the physical feature point P in the camera coordinate system ($X_1$, $Y_1$, $Z_1$) may indicate the 3D sensor coordinates of the physical feature point P relative to the first point of origin $C_1$ of the first camera coordinate system ($X_1$, $Y_1$, $Z_1$). As described elsewhere herein, the first point of origin $C_1$ may indicate the first sensor position of the first vehicle platform 103 selected as the target vehicle platform when the first image 702 is captured.

In some embodiments, the coordinate transformations performed by the camera coordinates processor 206 may include transforming the 2D image coordinates of the image feature point in the image coordinate system of the image to the 3D camera coordinates of the image feature point in the camera coordinate system of the corresponding image sensor capturing the image. The coordinate transformations performed by the camera coordinates processor 206 may also include transforming the 3D camera coordinates of the image feature point in the camera coordinate system of the corresponding image sensor to the 3D camera coordinates of the image feature point in the target camera coordinate system. For example, the camera coordinates processor 206 may transform the 2D image coordinates of the first image feature point $P_1$ in the first image coordinate system ($a_1$, $b_1$) of the first image 702 to the 3D camera coordinates of the first image feature point $P_1$ in the first camera coordinate system ($X_1$, $Y_1$, $Z_1$) of the first image sensor. Because the first camera coordinate system ($X_1$, $Y_1$, $Z_1$) of the first image sensor is also the target camera coordinate system, no further coordinate transformation is needed for the first image feature point $P_1$. Similarly, the camera coordinates processor 206 may transform the 2D image coordinates of the second image feature point $P_2$ in the second image coordinate system ($a_2$, $b_2$) of the second image 704 to the 3D camera coordinates of the second image feature point $P_2$ in the second camera coordinate system ($X_2$, $Y_2$, $Z_2$) of the second image sensor. The 3D camera coordinates of the second image feature point $P_2$ in the second camera coordinate system ($X_2$, $Y_2$, $Z_2$) of the second image sensor may then be transformed to the 3D camera coordinates of the second image feature point $P_2$ in the first camera coordinate system $(X_1, Y_1, Z_1)$ of the first image sensor (e.g., the target camera coordinate system).

Figure 7B:
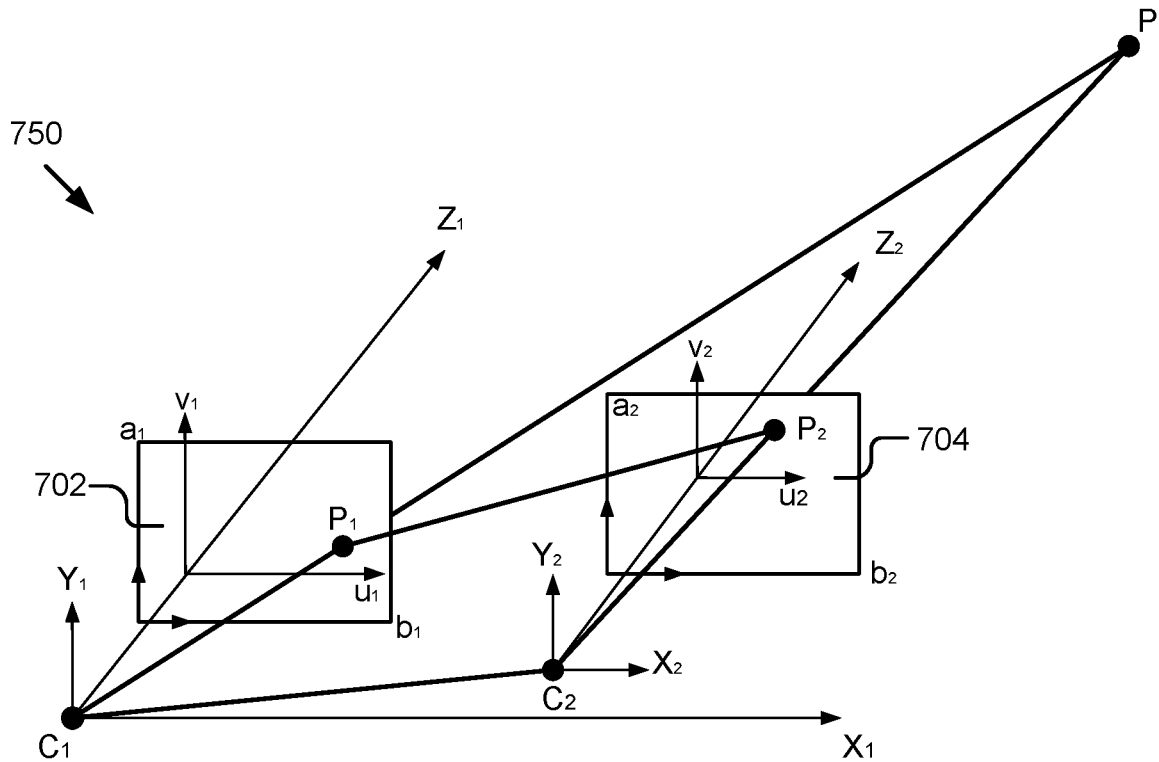
FIG. 7B illustrates coordinate transformation of an image feature point from a second camera coordinate system to a first camera coordinate system.
Figure 7C:
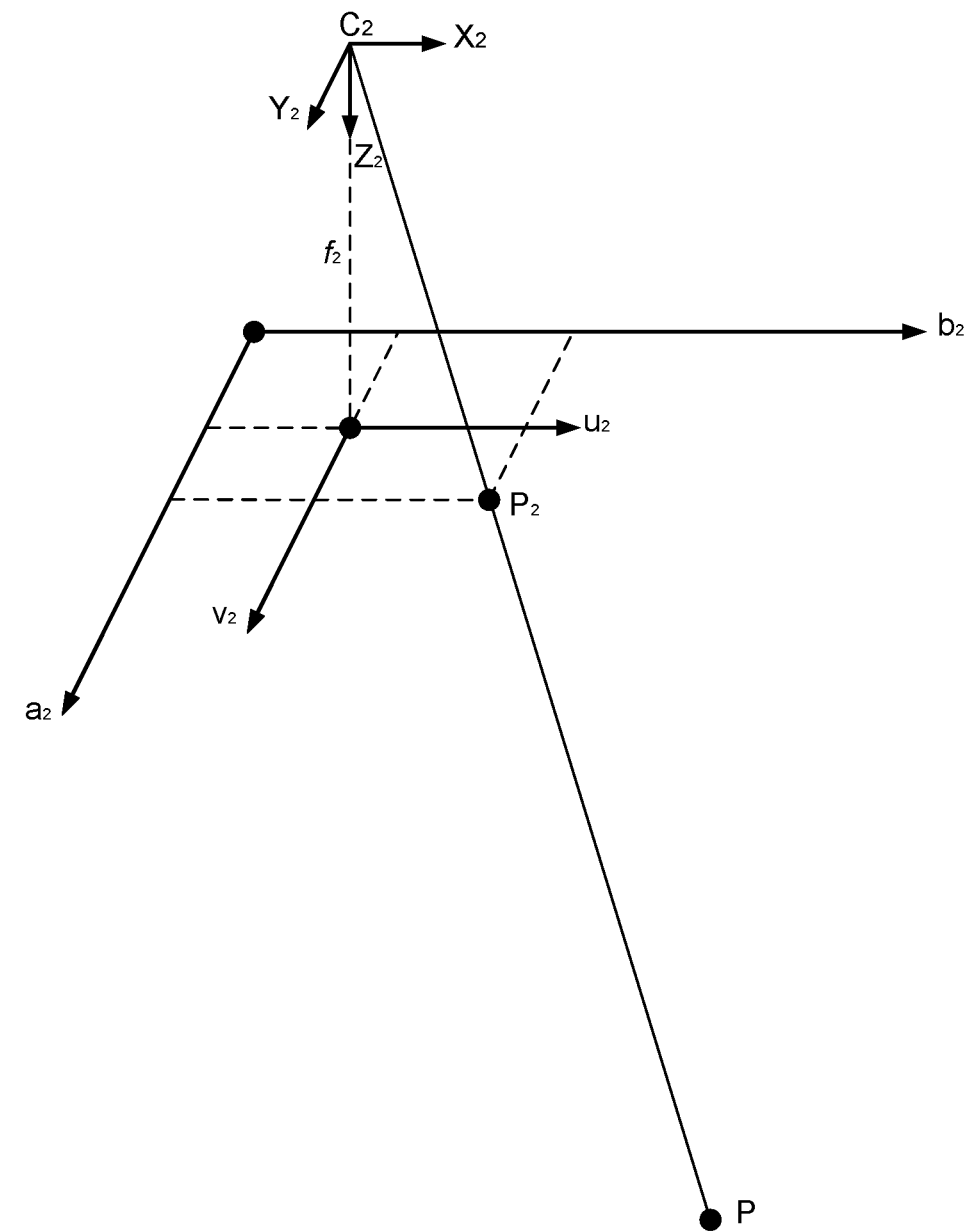
FIG. 7C illustrates coordinate transformation of an image feature point from an image coordinate system to a camera coordinate system.

FIG. 7C illustrates the coordinate transformation of the image feature point from the image coordinate system of the image to a camera coordinate system of the image sensor capturing the image. In particular, FIG. 7C illustrates the coordinate transformation transforming the 2D image coordinates of the second image feature point $P_2$ in the second image coordinate system $(a_2, b_2)$ of the second image 704 to the 3D camera coordinates of the second image feature point $P_2$ in the second camera coordinate system $(X_2, Y_2, Z_2)$ of the second image sensor. In some embodiments, such coordinate transformation may be performed using the intrinsic camera parameters of the second image sensor. For example, the camera coordinates processor 206 may determine the 2D image coordinates of the second image feature point $P_2$ in the second image coordinate system $(a_2, b_2)$ of the second image 704, and convert the 2D image coordinates of the second image feature point $P_2$ in the second image coordinate system $(a_2, b_2)$ to the 2D image coordinates of the second image feature point $P_2$ in the pixel coordinate system $(u_2, v_2)$ using the scale factors, the distortion metrics, the skew coefficients, etc. of the second image sensor.

In some embodiments, the camera coordinates processor 206 may then transform the 2D image coordinates of the second image feature point $P_2$ in the pixel coordinate system $(u_2, v_2)$ to the 3D camera coordinates of the second image feature point $P_2$ in the second camera coordinate system $(X_2, Y_2, Z_2)$ of the second image sensor, using the focal length $f_2$ of the second image sensor. As depicted in FIG. 7C, the second image coordinate system $(a_2, b_2)$ representing image plane of the second image 704 is perpendicular to the optical axis $Z_2$ of the second image sensor, and at the distance of the focal length $f_2$ to the second point of origin $C_2$ of the second camera coordinate system $(X_2, Y_2, Z_2)$. Therefore, the z-coordinate of the second image feature point $P_2$ on the $Z_2$ axis is $f_2$ or $-f_2$ depending on whether the second image feature point $P_2$ is the virtual image or the real image of the physical feature point P. Similarly, the camera coordinates processor 206 may transform the 2D image coordinates of the first image feature point $P_1$ in the first image coordinate system $(a_1, b_1)$ of the first image 702 to the 3D camera coordinates of the first image feature point $P_1$ in the first camera coordinate system $(X_1, Y_1, Z_1)$ of the first image sensor in a similar manner.

In some embodiments, the camera coordinates processor 206 may then transform the 3D camera coordinates of the second image feature point $P_2$ in the second camera coordinate system $(X_2, Y_2, Z_2)$ of the second image sensor to the 3D camera coordinates of the second image feature point $P_2$ in the first camera coordinate system $(X_1, Y_1, Z_1)$ of the first image sensor. As discussed elsewhere herein, such coordinate transformation may be performed using the extrinsic camera parameters of the first image sensor and the second image sensor reflected in the rotation matrix R and the translation vector t. In some embodiments, the coordinate transformation of the second image feature point $P_2$ from the second camera coordinate system $(X_2, Y_2, Z_2)$ to the first camera coordinate system $(X_1, Y_1, Z_1)$ may be considered as placing the second camera coordinate system $(X_2, Y_2, Z_2)$ together with the second image feature point $P_2$ included therein into the first camera coordinate system $(X_1, Y_1, Z_1)$.

FIG. 7B illustrates the first camera coordinate system $(X_1, Y_1, Z_1)$ with the second camera coordinate system $(X_2, Y_2, Z_2)$ and the second image feature point $P_2$ included therein being transformed into the first camera coordinate system $(X_1, Y_1, Z_1)$. As depicted, the $X_2$-axis, $Y_2$-axis, and $Z_2$-axis of the second camera coordinate system $(X_2, Y_2, Z_2)$ are respectively aligned with the $X_1$-axis, $Y_1$-axis, and $Z_1$-axis of the first camera coordinate system $(X_1, Y_1, Z_1)$. The 3D camera coordinates of the second point of origin $C_2$ in the first camera coordinate system $(X_1, Y_1, Z_1)$ may indicate the relative position between the first sensor position of the first image sensor indicated by the first point of origin $C_1$ and the second sensor position of the second image sensor indicated by the second point of origin $C_2$.

With the first point of origin $C_1$, the second point of origin $C_2$, the first image feature point $P_1$, and the second image feature point $P_2$ are associated with the same target camera coordinate system (e.g., the first camera coordinate system $(X_1, Y_1, Z_1)$) and their 3D camera coordinates in the first camera coordinate system $(X_1, Y_1, Z_1)$ are determined, the camera coordinates processor 206 may compute the 3D camera coordinates of the physical feature point P in the first camera coordinate system $(X_1, Y_1, Z_1)$ based on these 3D camera coordinates. In some embodiments, the camera coordinates processor 206 may compute a projection matrix for projecting the physical feature point P into the first camera coordinate system $(X_1, Y_1, Z_1)$. The projection matrix may be generated by multiplying a plurality of matrices together. The plurality of matrices may reflect the extrinsic camera parameters and/or the intrinsic camera parameters of the first image sensor and the second image sensor. In some embodiments, the camera coordinates processor 206 may calculate the 3D camera coordinates of the physical feature point P in the first camera coordinate system $(X_1, Y_1, Z_1)$ by multiplying the 2D image coordinates of the first image feature point $P_1$ by the projection matrix. In other embodiments, the camera coordinates processor 206 may calculate the 3D camera coordinates of the physical feature point P in the first camera coordinate system $(X_1, Y_1, Z_1)$ by multiplying the 2D image coordinates of the second image feature point $P_2$ by the projection matrix.

Referring back to FIG. 3, in block 312, the situation geolocation calculator 208 may convert the 3D sensor coordinates of the one or more related situation objects to the geolocation coordinates of the one or more related situation objects using the geolocation data of the vehicle platforms 103 associated with the matched images. For example, the situation geolocation calculator 208 may convert the 3D camera coordinates of the physical feature point P in the first camera coordinate system $(X_1, Y_1, Z_1)$ to the geolocation coordinates (e.g., GPS coordinates) of the physical feature point P using the geolocation data of the first vehicle platform 103 associated with the first image 702 and the geolocation data of the second vehicle platform 103 associated with the second image 704.

Figure 4:
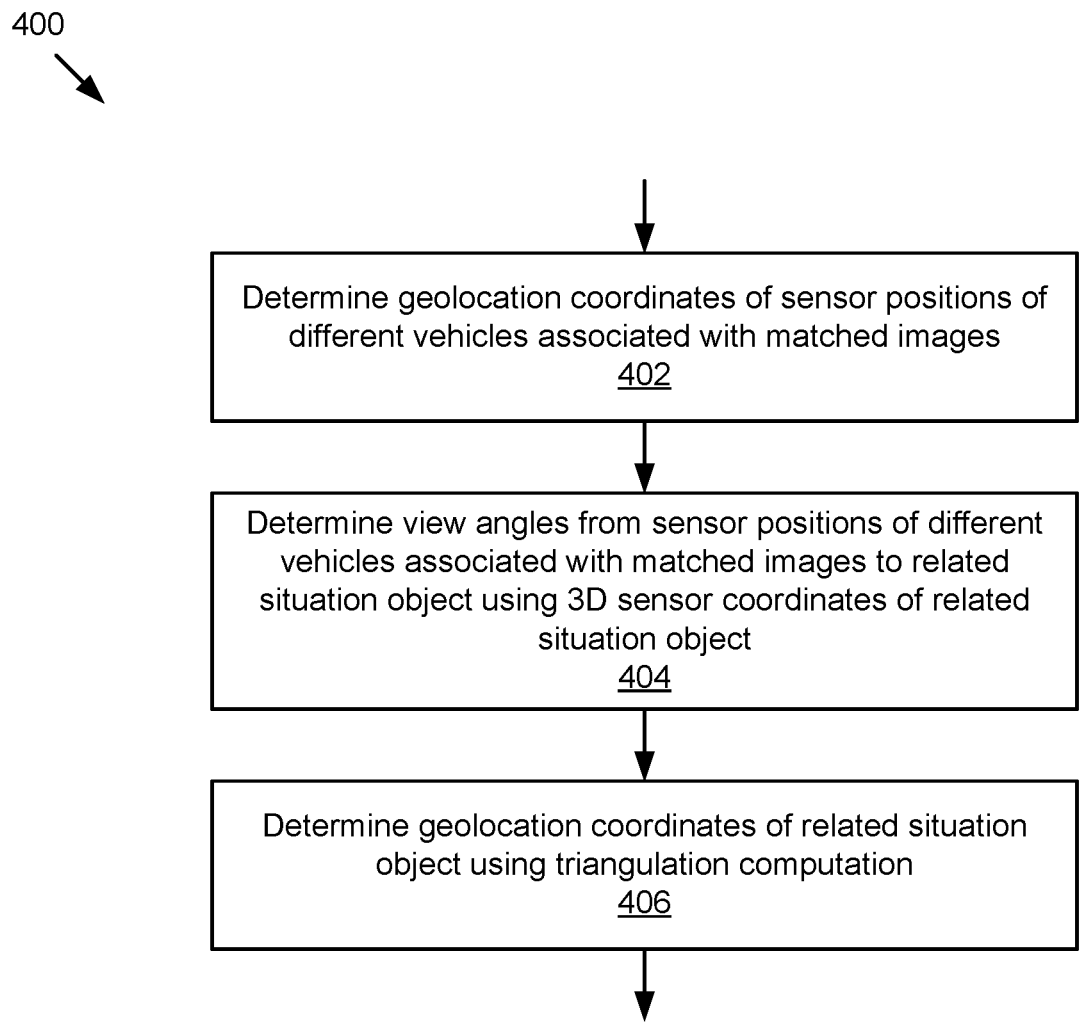
FIG. 4 is a flowchart of an example method for determining geolocation coordinates of a related situation object.

By way of further illustration, FIG. 4 is a flowchart of an example method 400 for determining the geolocation coordinates of the related situation objects. In block 402, the situation geolocation calculator 208 may determine the geolocation coordinates of the sensor positions of different vehicle platforms 103 associated with the matched images. In some embodiments, the geolocation coordinates of the sensor position of the vehicle platform 103 associated with a matched image may be the geolocation coordinates of the vehicle platform 103 when the matched image is captured and may be retrieved from the situation data associated with the vehicle platform 103.

In the above example, the situation geolocation calculator 208 may determine the geolocation coordinates of the first sensor position of the first vehicle platform 103 associated with the first image 702 to be the geolocation coordinates (e.g., GPS coordinates) of the first vehicle platform 103 when the first image 702 is captured. The situation geolocation calculator 208 may then determine the geolocation coordinates (e.g., GPS coordinates) of the first point of origin $C_1$ to be the geolocation coordinates of the first sensor position of the first vehicle platform 103 associated with the first image 702. Similarly, the situation geolocation calculator 208 may determine the geolocation coordinates of the second sensor position of the second vehicle platform 103 associated with the second image 704 to be the geolocation coordinates (e.g., GPS coordinates) of the second vehicle platform 103 when the second image 704 is captured. The situation geolocation calculator 208 may then determine the geolocation coordinates (e.g., GPS coordinates) of the second point of origin $C_2$ to be the geolocation coordinates of the second sensor position of the second vehicle platform 103 associated with the second image 704.

In block 404, the situation geolocation calculator 208 may determine the view angles from the sensor positions of different vehicle platforms 103 associated with the matched images to a first related situation object among the related situation objects in the matched images. In some embodiments, these view angles may be determined using the 3D sensor coordinates of the first related situation object. As discussed elsewhere herein, in the above example, the first sensor position of the first vehicle platforms 103 associated with the first image 702 may be indicated by the first point of origin $C_1$, and the second sensor position of the second vehicle platforms 103 associated with the second image 704 may be indicated by the second point of origin $C_2$. Therefore, the situation geolocation calculator 208 may determine the view angles from the first point of origin $C_1$ and the second point of origin $C_2$ to the physical feature point P of the first related situation object. Because the first point of origin $C_1$, the second point of origin $C_2$, and the physical feature point P are associated with the same target camera coordinate system (e.g., the first camera coordinate system $(X_1, Y_1, Z_1)$) and their 3D camera coordinates in the first camera coordinate system $(X_1, Y_1, Z_1)$ are determined, the situation geolocation calculator 208 may compute the view angles from the first point of origin $C_1$ and the second point of origin $C_2$ to the physical feature point P based on these 3D camera coordinates.

In block 406, the situation geolocation calculator 208 may determine the geolocation coordinates (e.g., GPS coordinates) of the first related situation object based on the geolocation coordinates of the sensor positions of the different vehicle platforms 103 and the view angles from the sensor positions of the different vehicle platforms 103 to the first related situation object using triangulation computation. In particular, in the above example, the first point of origin $C_1$, the second point of origin $C_2$, and the physical feature point P may form a triangle. Because the geolocation coordinates of the first point of origin $C_1$, the geolocation coordinates of the second point of origin $C_2$, and the view angles from the first point of origin $C_1$ and the second point of origin $C_2$ to the physical feature point P are determined, the situation geolocation calculator 208 may compute the geolocation coordinates (e.g., GPS coordinates) of the physical feature point P based on these factors using triangulation computation. In some embodiments, the absolute distance, the azimuth and/or the bearing angle of the physical feature point P in the GPS coordinate system may be determined.

In some embodiments, the situation geolocation calculator 208 may verify the geolocation coordinates of the physical feature point P. For example, the situation geolocation calculator 208 may match the first image feature point $P_1$ in the first image 702 with various second image feature point $P_2$ in various second image 704 captured by different second vehicle platform 103. Each matching pair of (first image feature point $P_1$, second image feature point $P_2$) may be used to compute the geolocation coordinates of the physical feature point P as discussed above. In some embodiments, the situation geolocation calculator 208 may compare the geolocation coordinates of the physical feature point P calculated from various matching pairs of (first image feature point $P_1$, second image feature point $P_2$). If the difference between these geolocation coordinates of the physical feature point P satisfies a predetermined difference threshold (e.g., the distance between these geolocation coordinates is below 25 cm), the situation geolocation calculator 208 may verify that the geolocation coordinates of the physical feature point P is accurate.

Referring back to FIG. 3, in block 316, the situation geolocation calculator 208 may determine the coverage area of the traffic situation based on the geolocation coordinates of the related situation objects. In some embodiments, the situation geolocation calculator 208 may retrieve the geographical map of the geographic region (e.g., predefined road segments) captured in the matched images from the map database. The geographic region may be associated with the image cluster including the matched images. In some embodiments, the situation geolocation calculator 208 may position the related situation objects on the geographical map of the geographic region using the geolocation coordinates of related situation objects. For example, the situation geolocation calculator 208 may position the physical feature point P of the first related situation object on the geographical map using the geolocation coordinates (e.g., the GPS coordinates) of the physical feature point P. As multiple physical feature points of the first related situation object are placed on the geographical map, the first related situation object may be projected on the geographical map at its accurate geographic location.

In some embodiments, the situation geolocation calculator 208 may determine a convex geographical area encompassing the related situation objects on the geographic map to be the coverage area of the traffic situation. For example, the situation geolocation calculator 208 may use Graham Scan algorithm to determine the largest convex hull that covers the related situation objects. As the related situation objects are positioned on the geographical map at their corresponding geolocation coordinates, the coverage area may be precisely localized and may provide a comprehensive understanding of the traffic situation in various aspects. For example, the coverage area of the traffic situation may indicate the geographic location of the traffic situation, the geometric boundary (e.g., geometric shape, occupied lanes) of the traffic situation, the scene components (e.g., the related situation objects present in the traffic situation), the distributions of these related situation objects, etc.

Figure 5:
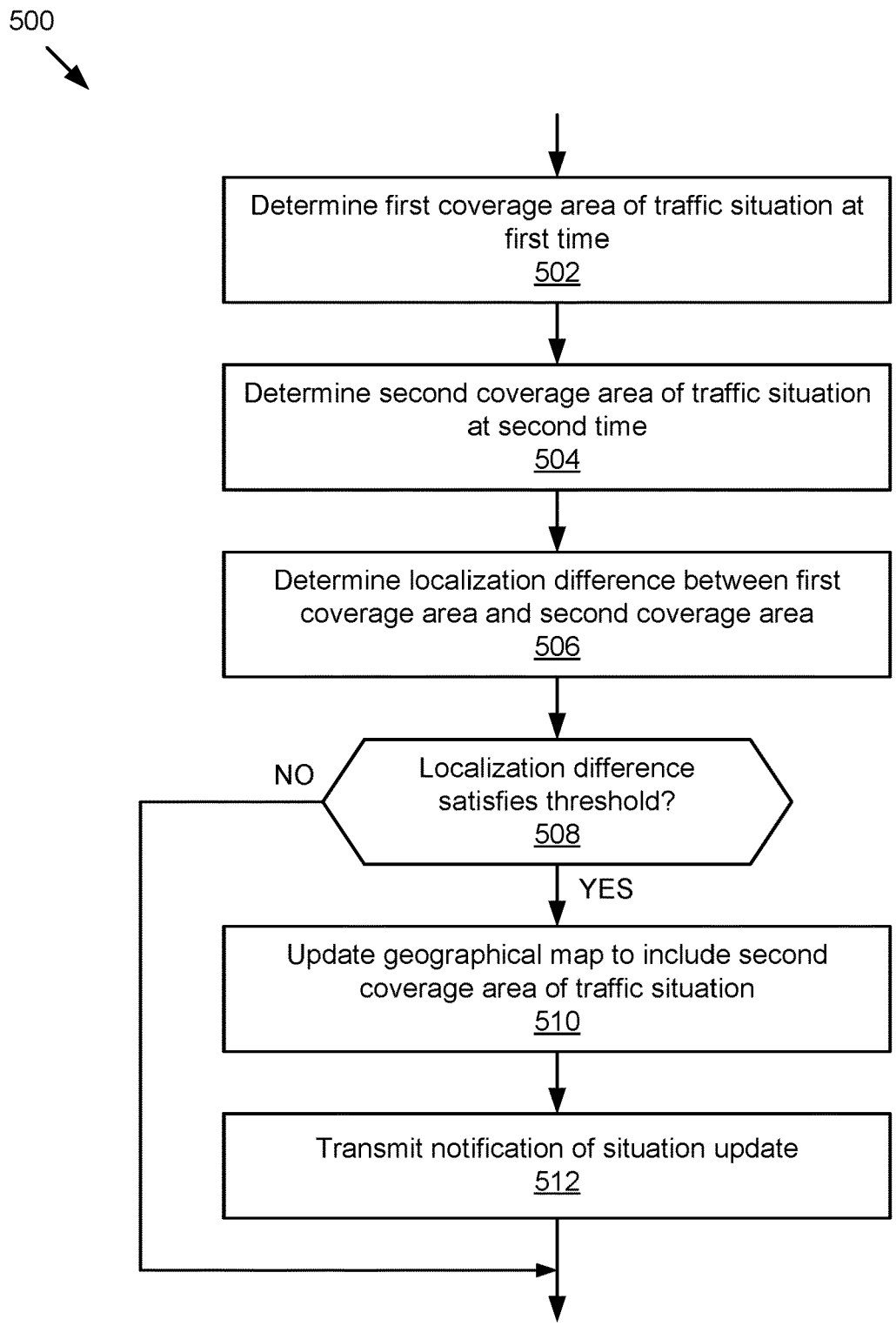
FIG. 5 is a flowchart of an example method for updating the coverage area representing the traffic situation.
Figure 8A:
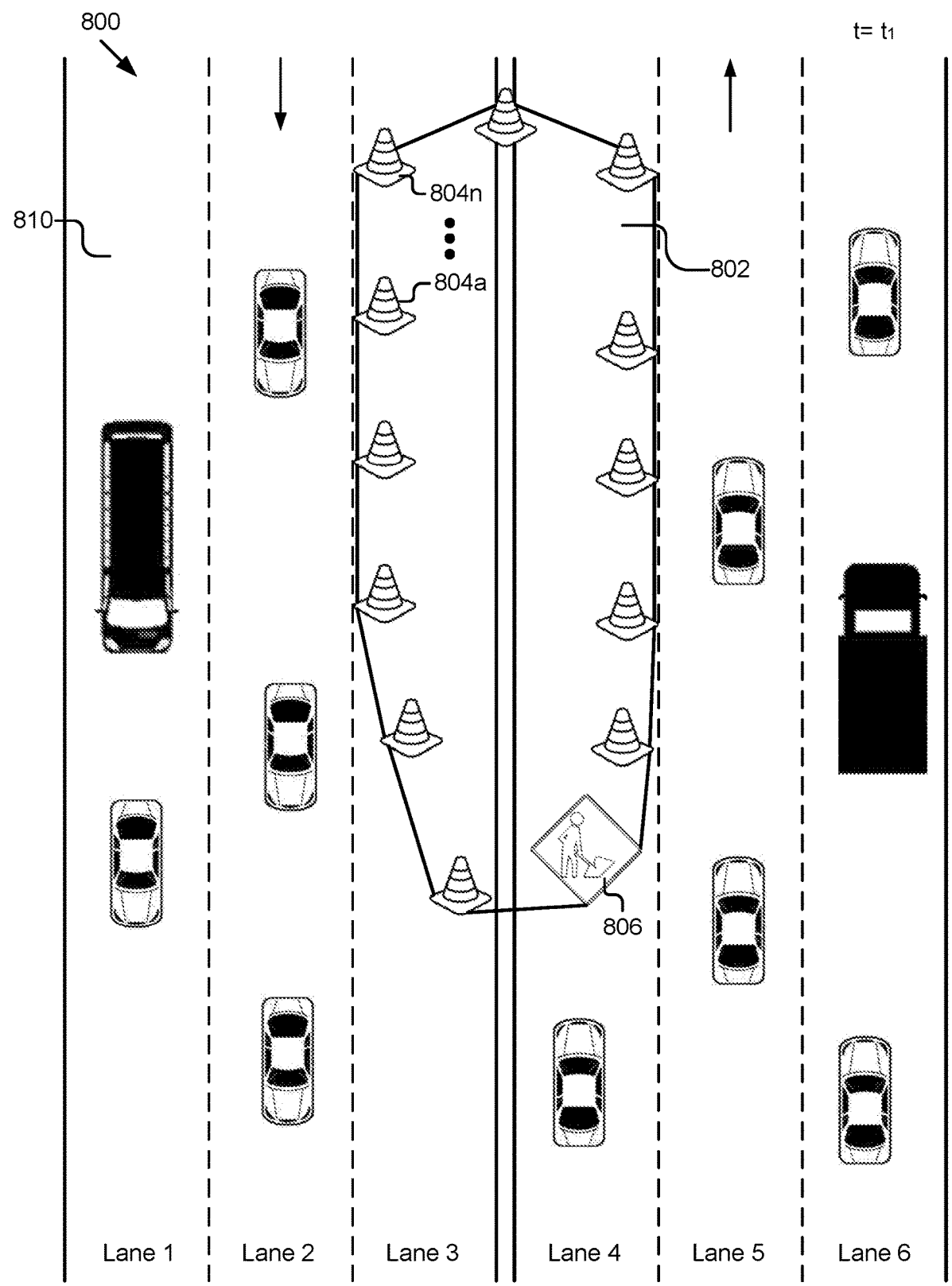
FIG. 8A illustrates an example road segment with a traffic situation at a first time.

In some embodiments, the situation localization manager 210 of the situation localizing application 120 may monitor the traffic situation and update the coverage area representing the traffic situation as the traffic situation dynamically changes over time. FIG. 5 is a flowchart of an example method 500 for updating the coverage area representing the traffic situation. In block 502, the situation localization manager 210 may determine a first coverage area of a traffic situation at a first time. As an example, FIG. 8A illustrates a traffic situation of construction scene on the road segment 810 at the first time $t=t_1$. As depicted, the traffic situation of construction scene at the first time $t=t_1$ may be represented by the first coverage area 802. The first coverage area 802 may cover a plurality of related situation objects (e.g., the traffic cones 804 and the construction sign 806) and may be determined based on the images captured by the vehicle platforms 103 located in the road segment 810 at the first time $t=t_1$.

The situation localization manager 210 may process traffic situation coverage area data for a multiplicity of vehicles and maintain a dynamic map reflect traffic situations and their evolution over time, such as the beginning, end, expansion, and contraction of the footprint of the traffic situations. The situation localization manager 210 may store the dynamic map data in the data store 124 and/or in the memory 117 or and/or other non-transitory storage device of vehicle platforms 103. The navigation application 122 may retrieve and process the dynamic map data to calculate navigation routes, traffic congestion estimates, and/or generate and provide alerts, updates, route recalculation, and/or other information. For instance, the navigation application 122 may display on a touch sensitive display and/or output via a speaker, instructive feedback, alerts, etc., to drivers and/or passengers of the vehicle platforms, such as but not limited to a description of a relevant traffic situation coverage area, such as one the vehicle may be approaching, one along a pre-calculated travel route, one along an arbitrary route the user may be traversing, etc. The navigation information may reflect an up-to-date state of the traffic situation along with the best information for traversing and/or circumventing the traffic situation. For instance, a lane that was previously open may now have a tow truck occupying it, and the dynamic traffic information presented by the navigation application 122 may dynamically show graphical information on the display showing a footprint of the traffic situation, the obstacles (tow truck, disabled vehicles, and/or a route for traversing the same, etc).

In some embodiments, the navigation application 122 can receive input data requesting to perform an action associated with information (e.g., corresponding to an alert, navigation data, etc.) presented by the navigation application 122 from the user, and instruct the navigation application 122 to perform an action. For instance, the user may select a dedicated hardware button coupled to the bus 154 and/or a digital button presented on a touch-sensitive display (coupled to the bus 154) of the vehicle platform, or issue a voice command via a voice system (e.g., microphone, etc., coupled to the bus 154), etc. The vehicle platform 103 may include one or more input device(s), which may comprise any standard devices configured to receive a variety of control inputs (e.g., gestures, voice controls) from a person or other devices. Non-limiting example input device 219 may include a touch screen for inputting texting information, making selection, and interacting with the user 115; motion-detecting input devices; audio input devices; other touch-based input devices; keyboards; pointer devices; indicators; and/or any other inputting components for facilitating communication and/or interaction with a person or the other devices. The input device(s) may be coupled to other components of the vehicle platform 103 either directly or through intervening controllers to relay inputs/signals received from people and/or sensor(s).

The navigation application 122 may receive the input and process it (e.g., interpret button press, voice command, etc.), and implement an action corresponding to the command, such as accept or reject an alternative route, confirm an existence of a traffic situation, etc. to be an action command to navigate to the restaurant. For instance, the navigation application 122 may set an alternative route and/or a way-point, causing the navigation application 122 to provide turn-by-turn directions via the alternative route and/or way-point. In another example, the navigation application 122 may present information about the traffic situation and/or other nearby or approaching situations. While not depicted, a vehicle platform may include output device(s) coupled to the bus which may comprise any devices configured to output or display information to a user 115 or other devices. Non-limiting example output device(s) 221 may include a touch screen for displaying notifications, navigation information, multimedia information, settings, etc., an audio reproduction device (e.g., speaker) for delivering sound information, a display/monitor for presenting texting or graphical information to the user 115, etc. The outputting information may be text, graphic, tactile, audio, video, and other information that may be understood by the driver and/or passengers or the other devices, or may be data, logic, programming that can be readable by the operating system of the vehicle platform 103 and/or other computing devices. The output device(s) may be coupled to other components of the vehicle platform 103 directly or through intervening controllers. In some implementations, a set of output device(s) 221 may be included in or form a control panel that a person may interact with to adjust settings and/or control of a vehicle platform 103 (e.g., driver controls, infotainment controls, guidance controls, safety controls, etc.).

Figure 8B:
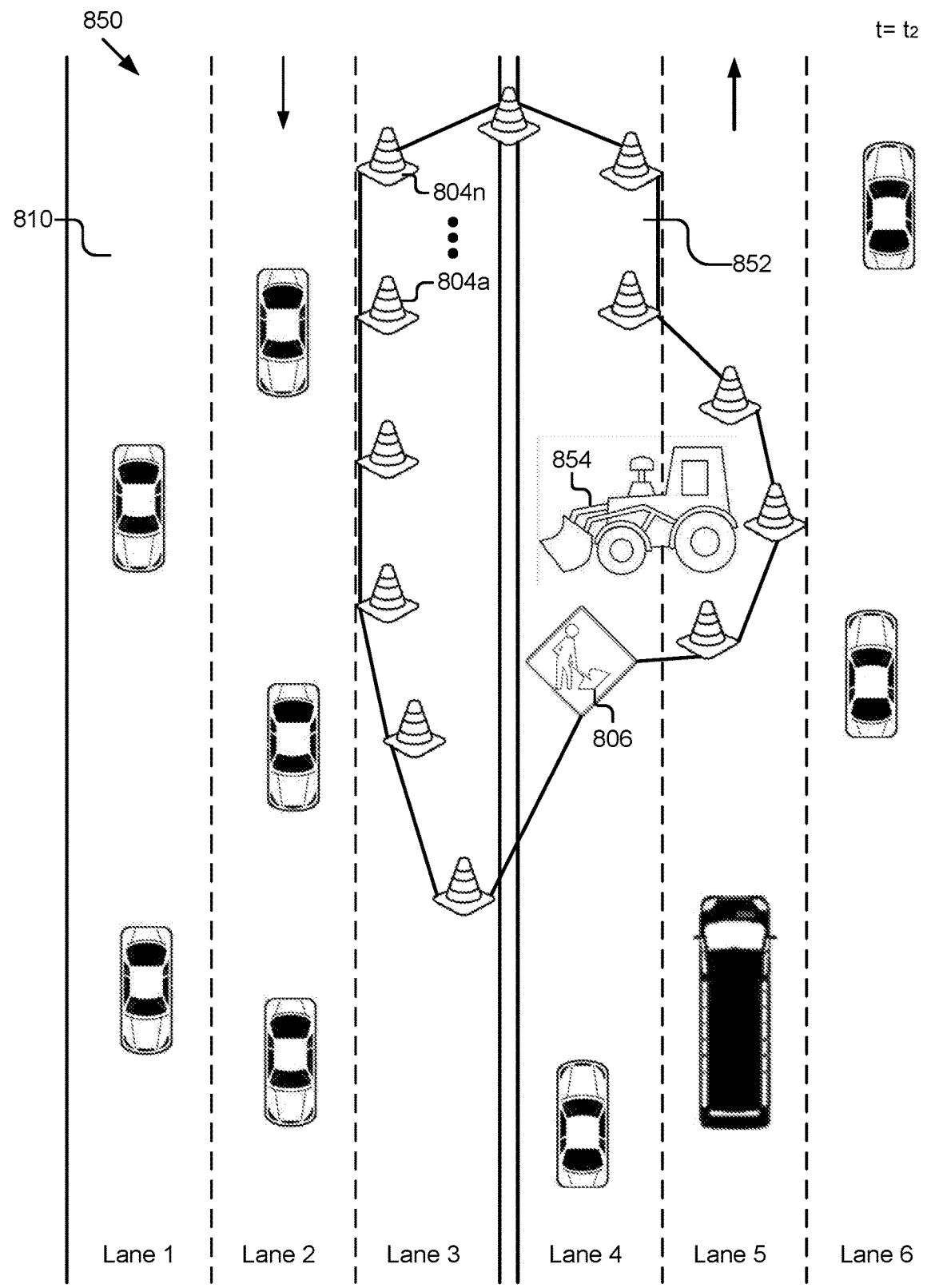
FIG. 8B illustrates the example road segment with the traffic situation at a second time.

In block 504, the situation localization manager 210 may determine a second coverage area of the traffic situation at a second time. As an example, FIG. 8B illustrates the same traffic situation of construction scene on the road segment 810 at the second time $t=t_2$. As depicted, the traffic situation of construction scene at the second time $t=t_2$ may be represented by the second coverage area 852. The second coverage area 852 may cover a plurality of related situation objects (e.g., the traffic cones 804, the construction sign 806, and the construction vehicle 854) and may be determined based on the images captured by the vehicle platforms 103 located in the road segment 810 at the second time $t=t_2$. In this example, the second coverage area 852 representing the traffic situation at the second time $t=t_2$ includes an additional related situation objects (e.g., the construction vehicle 854) and the existing related situation objects (e.g., the traffic cones 804 and the construction sign 806) are rearranged. In some embodiments, the navigation application 122 may present dynamic information showing the object(s) involved in the traffic situation and/or changes to the dynamic state of the traffic situation. This advantageous as a traffic situation is often dynamic and/or semi-dynamic/static and likely to change over time (minutes, hours, days, etc.).

In block 504, the situation localization manager 210 may determine a localization difference between the first coverage area and the second coverage area of the traffic situation. In block 508, the situation localization manager 210 may determine whether the localization difference between the first coverage area and the second coverage area of the traffic situation satisfies a difference threshold. In some embodiments, the localization difference may be determined based on the lanes occupied by the first coverage area and the second coverage area of the traffic situation. If one or more second lanes occupied by the second coverage area are different from one or more first lanes occupied by the first coverage area, the situation localization manager 210 may determine that the localization difference between the first coverage area and the second coverage area of the traffic situation satisfies the difference threshold.

As an example, the situation localization manager 210 may map the first coverage area 802 of the traffic situation at the first time t=t₁ and the second coverage area 852 of the traffic situation at the second time t=t₂ to the geographical map of the road segment 810. Accordingly, the situation localization manager 210 may determine that the first coverage area 802 occupies two lanes (e.g., lane 3 and lane 4) of the road segment 810, while the second coverage area 852 occupies three lanes (e.g., lane 3, lane 4, and lane 5) of the road segment 810. Because the second coverage area 852 occupies an additional lane (e.g., lane 5) as compared to the first coverage area 802, the situation localization manager 210 may determine that the localization difference between the first coverage area 802 and the second coverage area 852 of the traffic situation satisfies the difference threshold. As another example, assuming that the second coverage area 852 still occupies the same two lanes (e.g., e.g., lane 3 and lane 4) as the first coverage area 802 although additional related situation objects are introduced and/or the existing related situation objects are relocated. In this example, the situation localization manager 210 may determine that the localization difference between the first coverage area 802 and the second coverage area 852 of the traffic situation does not satisfy the difference threshold.

If in block 508, the situation localization manager 210 determines that the localization difference between the first coverage area and the second coverage area of the traffic situation satisfies the difference threshold, the method 500 proceeds to block 510. In block 510, the situation localization manager 210 may update the geographical map associated with the geographic region to include the second coverage area of the traffic situation. For example, the situation localization manager 210 may update the geographical map of the road segment 810 to include the second coverage area 852 representing the traffic situation at the second time t=t₂.

In block 512, the situation localization manager 210 may transmit a notification of situation update to proximate vehicle platforms 103 associated with the geographic region (e.g., the road segment 810). In some embodiments, the proximate vehicle platforms 103 associated with the geographic region may include the vehicle platforms 103 currently proximate to the geographic region. Examples of the proximate vehicle platforms 103 associated with the geographic region may include, but are not limited to, the vehicle platforms 103 approaching the geographic region (e.g., the vehicle platforms 103 predicted to reach the road segment 810 within the next 15 minutes), the vehicle platforms 103 that have passed the geographic region (e.g., the vehicle platforms 103 have passed the road segment 810 within the last 10 minutes), the vehicle platforms 103 travelling within a predetermined distance from the geographic region (e.g., vehicles travelling within the radius of two miles from the road segment 810), etc. In some embodiments, the notification of situation update may include the second coverage area of the traffic situation. The notification of situation update and/or the second coverage area of the traffic situation may be displayed on an output device of the proximate vehicle platforms 103 to inform the users about the traffic situation occupying at least a portion of the geographic region.

In some embodiments, the situation localization manager 210 may transmit the notification of situation update to the navigation application 122 to adjust the navigation paths of the proximate vehicle platforms 103 according to the second coverage area of the traffic situation. For example, referring to FIGS. 8A and 8B, assuming that a proximate vehicle platform 103 is driving on lane 6 and have recently passed the road segment 810. This proximate vehicle platform 103 may receive the notification of situation update with the second coverage area of the traffic situation indicating that the traffic situation now additionally occupies lane 5 as described above. Because traffic in lane 5 on the road segment 810 cannot proceed due to the traffic situation, therefore there would be no vehicle approaching the road segment ahead of the road segment 810 in lane 5. Therefore, the navigation application 122 may update the navigation path of the proximate vehicle platform 103 accordingly, and provide a navigational suggestion to its user to shift from lane 6 to lane 5 for faster commute.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    receiving situation data including images from vehicles;
    clustering, into an image cluster, the images included in the situation data of one or more vehicles located in a geographic region from among the vehicles;
    locating one or more related situation objects in one or more images of the image cluster;
    matching images from different vehicles in the image cluster, the matched images having one or more corresponding features of the one or more related situation objects;
    determining three-dimensional (3D) sensor coordinates of the one or more related situation objects relative to a sensor position of a target vehicle associated with at least one of the matched images, using the one or more corresponding features of the one or more related situation objects in the matched images;
    converting the 3D sensor coordinates of the one or more related situation objects to geolocation coordinates of the one or more related situation objects using geolocation data of the different vehicles associated with the matched images; and
    determining a coverage area of a traffic situation based on the geolocation coordinates of the one or more related situation objects.

2. The method of claim 1, wherein the matched images from the different vehicles are captured by images sensors having different sensor configurations.

3. The method of claim 1, wherein converting the 3D sensor coordinates of the one or more related situation objects to the geolocation coordinates of the one or more related situation objects includes:
    determining geolocation coordinates of sensor positions of the different vehicles associated with the matched images;
    determining view angles from the sensor positions of the different vehicles associated with the matched images to a first related situation object among the one or more related situation objects using the 3D sensor coordinates of the first related situation object; and
    determining the geolocation coordinates of the first related situation object based on the geolocation coordinates of the sensor positions of the different vehicles and the view angles from the sensor positions of the different vehicles to the first related situation object using triangulation computation.

4. The method of claim 1, wherein determining the coverage area of the traffic situation includes:
positioning the one or more related situation objects on a geographical map associated with the geographic region using the geolocation coordinates of the one or more related situation objects; and
determining a convex geographical area encompassing the one or more related situation objects on the geographical map to be the coverage area of the traffic situation.

5. The method of claim 1, further comprising:
determining a first coverage area of the traffic situation at a first time;
determining a second coverage area of the traffic situation at a second time;
determining a localization difference between the first coverage area and the second coverage area;
determining that the localization difference between the first coverage area and the second coverage area satisfies a difference threshold; and
responsive to determining that the localization difference between the first coverage area and the second coverage area satisfies the difference threshold, updating a geographical map associated with the geographic region to include the second coverage area of the traffic situation.

6. The method of claim 5, wherein determining that the localization difference between the first coverage area and the second coverage area satisfies the difference threshold includes:
determining one or more first lanes associated with the first coverage area;
determining one or more second lanes associated with the second coverage area; and
determining that the one or more second lanes are different from the one or more first lanes.

7. The method of claim 5, further comprising:
determining one or more proximate vehicles associated with the geographic region; and
transmitting a notification of situation update to the one or more proximate vehicles, the notification of situation update including the second coverage area of the traffic situation.

8. The method of claim 1, wherein the geographic region is a predefined road segment.

9. The method of claim 1, wherein clustering the images included in the situation data of the one or more vehicles located in the geographic region includes:
clustering the images based on image timestamps of the images.

10. The method of claim 1, wherein the situation data received from a first vehicle among the vehicles includes one or more of a first image captured by an image sensor of the first vehicle, image data associated with the first image, a sensor configuration of the image sensor, and the geolocation data of the first vehicle associated with the first image.

11. A system comprising:
one or more processors;
one or more memories storing instructions that, when executed by the one or more processors, cause the system to:
receive situation data including images from vehicles;
cluster, into an image cluster, the images included in the situation data of one or more vehicles located in a geographic region from among the vehicles;
locate one or more related situation objects in one or more images of the image cluster;
match images from different vehicles in the image cluster, the matched images having one or more corresponding features of the one or more related situation objects;
determine three-dimensional (3D) sensor coordinates of the one or more related situation objects relative to a sensor position of a target vehicle associated with at least one of the matched images, using the one or more corresponding features of the one or more related situation objects in the matched images;
convert the 3D sensor coordinates of the one or more related situation objects to geolocation coordinates of the one or more related situation objects using geolocation data of the different vehicles associated with the matched images; and
determine a coverage area of a traffic situation based on the geolocation coordinates of the one or more related situation objects.

12. The system of claim 11, wherein the matched images from the different vehicles are captured by images sensors having different sensor configurations.

13. The system of claim 11, wherein to convert the 3D sensor coordinates of the one or more related situation objects to the geolocation coordinates of the one or more related situation objects includes:
determining geolocation coordinates of sensor positions of the different vehicles associated with the matched images;
determining view angles from the sensor positions of the different vehicles associated with the matched images to a first related situation object among the one or more related situation objects using the 3D sensor coordinates of the first related situation object; and
determining the geolocation coordinates of the first related situation object based on the geolocation coordinates of the sensor positions of the different vehicles and the view angles from the sensor positions of the different vehicles to the first related situation object using triangulation computation.

14. The system of claim 11, wherein to determine the coverage area of the traffic situation includes:
positioning the one or more related situation objects on a geographical map associated with the geographic region using the geolocation coordinates of the one or more related situation objects; and
determining a convex geographical area encompassing the one or more related situation objects on the geographical map to be the coverage area of the traffic situation.

15. The system of claim 11, wherein the instructions, when executed by the one or more processors, further cause the system to:
determine a first coverage area of the traffic situation at a first time;
determine a second coverage area of the traffic situation at a second time;
determine a localization difference between the first coverage area and the second coverage area;
determine that the localization difference between the first coverage area and the second coverage area satisfies a difference threshold; and
responsive to determining that the localization difference between the first coverage area and the second coverage area satisfies the difference threshold, update a geographical map associated with the geographic region to include the second coverage area of the traffic situation.

16. The system of claim 15, wherein to determine that the localization difference between the first coverage area and the second coverage area satisfies the difference threshold includes:
   determining one or more first lanes associated with the first coverage area;
   determining one or more second lanes associated with the second coverage area; and
   determining that the one or more second lanes are different from the one or more first lanes.

17. The system of claim 15, wherein the instructions, when executed by the one or more processors, further cause the system to:
   determine one or more proximate vehicles associated with the geographic region; and
   transmit a notification of situation update to the one or more proximate vehicles, the notification of situation update including the second coverage area of the traffic situation.

18. The system of claim 11, wherein the geographic region is a predefined road segment.

19. The system of claim 11, wherein to cluster the images included in the situation data of the one or more vehicles located in the geographic region includes:
   clustering the images based on image timestamps of the images.

20. The system of claim 11, wherein the situation data received from a first vehicle among the vehicles includes one or more of a first image captured by an image sensor of the first vehicle, image data associated with the first image, a sensor configuration of the image sensor, and the geolocation data of the first vehicle associated with the first image.

21. A method comprising:
   receiving situation data including images from vehicles;
   clustering, into an image cluster, the images included in the situation data of one or more vehicles located in a geographic region from among the vehicles;
   locating one or more related situation objects in one or more images of the image cluster;
   matching images from different vehicles in the image cluster, the matched images having one or more corresponding features of the one or more related situation objects;
   determining three-dimensional (3D) sensor coordinates of the one or more related situation objects relative to a sensor position of a target vehicle associated with at least one of the matched images, using the one or more corresponding features of the one or more related situation objects in the matched images;
   converting the 3D sensor coordinates of the one or more related situation objects to geolocation coordinates of the one or more related situation objects using geolocation data of the different vehicles associated with the matched images;
   determining a coverage area of a traffic situation based on the geolocation coordinates of the one or more related situation objects; and
   determining a navigation path associated with the geographical region based on the coverage area of the traffic situation.

* * * * *